United States Patent
Xu et al.

(10) Patent No.: US 8,698,374 B2
(45) Date of Patent: Apr. 15, 2014

(54) AUTOMATED DRIVE FREQUENCY CONTROL FOR RESONANT ACTUATOR SYSTEMS AND METHODS THEREOF

(75) Inventors: Qin Xu, West Henrietta, NY (US); Tom Guidarelli, Farmington, NY (US); Robert Culhane, Manchester, NY (US); Conrad Hoffman, Canandaigua, NY (US)

(73) Assignee: New Scale Technologies, Victor, NY (US)

( * ) Notice: Subject to any disclaimer, the term of this patent is extended or adjusted under 35 U.S.C. 154(b) by 1080 days.

(21) Appl. No.: 12/466,929

(22) Filed: May 15, 2009

(65) Prior Publication Data

US 2010/0289381 A1 Nov. 18, 2010

(51) Int. Cl.
*H01L 41/08* (2006.01)

(52) U.S. Cl.
USPC .......................................... 310/317; 310/328

(58) Field of Classification Search
USPC ............. 310/317, 328, 318, 319, 323.01, 310/323.02, 323.17, 323.18; 318/116
IPC ....................................................... H01L 41/08
See application file for complete search history.

(56) References Cited

U.S. PATENT DOCUMENTS

| | | | |
|---|---|---|---|
| 5,233,274 A | 8/1993 | Honda et al. | |
| 6,016,231 A | 1/2000 | Kanbara et al. | |
| 6,577,042 B2 * | 6/2003 | Lee et al. | 310/317 |
| 6,940,209 B2 | 9/2005 | Henderson | |
| 7,170,214 B2 | 1/2007 | Henderson et al. | |
| 7,309,943 B2 | 12/2007 | Henderson et al. | |
| 7,339,306 B2 | 3/2008 | Henderson | |
| 2005/0067921 A1 | 3/2005 | Yamamoto | |
| 2006/0049720 A1 * | 3/2006 | Henderson et al. | 310/328 |
| 2008/0018200 A1 * | 1/2008 | Vogeley et al. | 310/317 |
| 2008/0129145 A1 | 6/2008 | Lee et al. | |
| 2009/0009109 A1 | 1/2009 | Hashimoto | |
| 2010/0038996 A1 | 2/2010 | Xu et al. | |
| 2010/0039715 A1 | 2/2010 | Xu et al. | |

OTHER PUBLICATIONS

International Search Report for International Patent Application No. PCT/US2010/034175 (Jun. 30, 2010).
Written Opinion of the International Searching Authority for International Patent Application No. PCT/US2010/034175 (Jun. 24, 2010).

* cited by examiner

*Primary Examiner* — Thomas Dougherty
*Assistant Examiner* — Karen B Addison
(74) *Attorney, Agent, or Firm* — LeClairRyan, a Professional Corporation

(57) ABSTRACT

An actuator system includes an actuator device comprising at least one piezoelectric member, a driving system, and an actuator controller. The driving system drives the at least one piezoelectric member at a driving frequency. The actuator controller monitors at least one parameter of the actuator device and the direct driving system to determine an operational mechanical resonant frequency of the actuator device based on the at least one parameter. The actuator controller adjusts the driving frequency based at least in part on the determined operational mechanical resonant frequency.

50 Claims, 14 Drawing Sheets

AUTOMATED DRIVE FREQUENCY CONTROL FOR RESONANT ACTUATOR SYSTEMS AND METHODS THEREOF

CROSS REFERENCE TO RELATED APPLICATIONS

This application is related to: U.S. patent application Ser. No. 12/228,923 filed on Aug. 18, 2008, entitled, "Reduced-Voltage, Linear Motor Systems and Methods Thereof"; and to U.S. patent application Ser. No. 12/228,943, filed on Aug. 18, 2008, entitled, "Reduced-Voltage, Linear Motor Systems and Methods Thereof"; and to U.S. patent application Ser. No. 12/228,943, filed on 8/18/2008, entitled "Semi-Resonant Driving Systems and Methods Thereof", both of which are hereby incorporated herein by reference in their entireties.

FIELD OF THE INVENTION

The present invention generally relates to actuator systems and methods thereof and, more particularly, relates to automatic frequency control of actuator systems and methods thereof.

BACKGROUND

Transducers using piezoelectric technologies are used for precise positioning at the nanometer scale. Typically, piezoelectric devices include a ceramic that is formed into a capacitor that changes shape when charged and discharged. These piezoelectric devices can be used as position actuators because of their shape changing properties (i.e., vibrations). When such a piezoelectric device is used as a position actuator, the shape change of the ceramic is approximately proportional to an applied voltage differential across the ceramic.

Several types of resonant motor systems and resonant actuator systems use piezoelectric generated vibrations to create continuous movement of elements with high speed, high torque, small size, and quiet operation. An exemplary prior art motor is a linear motor system that includes a threaded element or nut. The threaded element includes four symmetrically positioned piezoelectric transducers or members. Driving signals drive the transducers to simultaneous excite the orthogonal bending modes of the threaded element at a first bending mode resonant frequency. The driving signals are typically in the ultrasonic range with a plus or minus ninety-degree phase shift to generate a circular orbit. The threaded element orbits a threaded shaft at the first bending mode resonant frequency, which generates torque that rotates the threaded shaft that moves the threaded shaft linearly.

Examples of the above resonant motor systems and resonant actuator systems may be found in U.S. Pat. No. 6,940,209, entitled, "Ultrasonic Lead Screw Motor"; U.S. Pat. No. 7,339,306, entitled, "Mechanism Comprised of Ultrasonic Lead Screw Motor"; U.S. Pat. No. 7,170,214, entitled, "Mechanism Comprised of Ultrasonic Lead Screw Motor"; and U.S. Pat. No. 7,309,943, entitled, "Mechanism Comprised of Ultrasonic Lead Screw Motor," all of which are commonly assigned to New Scale Technologies, Inc. and are all hereby incorporated herein by reference in their entireties.

A controller typically generates and supplies one or more driving signals to drive the piezoelectric transducers at a fixed driving frequency. The fixed driving frequency is typically selected to be close to a known or estimated nominal mechanical resonant frequency of the actuator system. Driving the piezoelectric transducers at such a nominal resonant frequency can increase the actuator's overall performance and efficiency. Increases in performance can include faster rotational and linear speeds and larger push forces. However, the resonant frequency of these actuators change based on variables including, but not limited to, ambient temperature, motor temperature, loading and manufacturing tolerances. Thus, driving a motor system and/or an actuator system with a fixed driving frequency can result in diminished performance over time. This loss in performance can cause the actuator to be less efficient, waste energy, run at slower than desired or optimal speeds, fail to move a specific load, and add strain to the motor system and/or actuator system.

Heretofore, some patents and publications have disclosed methods for driving resonant actuator devices, which may be briefly summarized as follows:

U.S. Pat. No. 5,233,274 to Honda et al. discloses a drive circuit used in a Langevin type ultrasonic bolt-tightening motor in which a motor drive voltage having a given frequency is applied to a piezo-electric element in a stator section, the resulting longitudinal and torsional vibrations being effective to rotate a motor section. The drive circuit has a longitudinal vibration sensor for detecting the longitudinal vibration in the stator section, a torsional vibration sensor for detecting vibration in the stator section and a frequency controller for controlling the frequency of the motor drive voltage such that the phase difference between the detection signals of the longitudinal and torsional vibration sensors becomes 90 degrees. The frequency of the motor drive voltage can be feedback controlled to maintain an optimum drive frequency despite the varying of the optimum drive frequency due to changes in various factors. The disclosure of this patent is incorporated herein by reference.

United States Patent Application Publication No. 2008/0129145 to Lee et al. discloses a piezoelectric actuator for driving a piezoelectric unit having two resonance points. The piezoelectric unit includes an optimal driving frequency calculating unit that adds a delta frequency, having a constant frequency difference from a first resonant frequency of the piezoelectric unit, to a characteristic resonant frequency obtained by analyzing characteristics of the piezoelectric unit, thereby calculating an optimal driving frequency; and an FM modulating unit that is connected to the optimal driving frequency calculating unit and generates the optimal driving frequency, calculated by the optimal driving frequency calculating unit, so as to supply to the piezoelectric unit. The disclosure of this published patent application is incorporated herein by reference.

United States Patent Application Publication No. 2009/0009109 to Hashimoto discloses a method for driving an ultrasonic motor having an actuator section. The method includes a step of starting the ultrasonic motor by applying an AC voltage with a first frequency to the actuator section; a voltage detection step of detecting a voltage generated at the actuator section while lowering a driving frequency from the first frequency to a second frequency at which the ultrasonic motor stops; a starting step of starting the ultrasonic motor with a third frequency; and a driving step of changing the driving frequency from the third frequency to a lower frequency such that the driving frequency has a value within an operation frequency range. The disclosure of this published patent application is incorporated herein by reference.

SUMMARY

An actuator system in accordance with embodiments of the present invention includes an actuator device comprising at least one piezoelectric member, a driving system, and an actuator controller. The driving system drives the at least one piezoelectric member at a driving frequency. The actuator controller monitors at least one parameter of the actuator device and the direct driving system to determine an operational mechanical resonant frequency of the actuator device based on the at least one parameter. The actuator controller adjusts the driving frequency based at least in part on the determined operational mechanical resonant frequency.

A method for making an actuator system in accordance with other embodiments of the present invention includes providing an actuator device comprising at least one piezoelectric member. A driving system is operatively coupled to drive the at least one piezoelectric member at a driving frequency. An actuator controller is operatively coupled to monitor at least one parameter of the actuator device and the direct driving system to determine an operational mechanical resonant frequency of the actuator device based on the at least one monitored parameter. The actuator controller is configured to adjust the driving frequency based at least in part on the determined operational mechanical resonant frequency.

A method for controlling an actuator system in accordance with embodiments of the present invention includes monitoring with an actuator controller computing system at least one parameter of an actuator device and a driving system coupled to drive the actuator device at a driving frequency. An operational mechanical resonant frequency of the actuator device is determined with the actuator controller computing system based on the at least one parameter. The driving frequency provided by the driving system is adjusted with the actuator controller computing system based at least in part on the determined operational mechanical resonant frequency.

A computer readable medium in accordance with other embodiments of the present invention includes having stored thereon instructions for controlling an actuator system comprising machine executable code which when executed by at least one processor, causes the processor to perform steps including monitoring at least one parameter of an actuator device and a driving system coupled to drive the actuator device at a driving frequency. An operational mechanical resonant frequency of the actuator device is determined based on the at least one parameter. The driving frequency provided by the driving system is adjusted based at least in part on the determined operational mechanical resonant frequency.

An actuator controller in accordance with other embodiments of the present invention includes a monitoring system, a controller management system, and an adjustment system in an actuator controller computing system. The monitoring system monitors at least one parameter of an actuator device and a driving system coupled to drive the actuator device at a driving frequency. The controller management system determines an operational mechanical resonant frequency of the actuator device based on the at least one parameter. The adjustment system adjusts the driving frequency provided by the driving system based at least in part on the determined operational mechanical resonant frequency.

The present invention provides a number of advantages including providing a higher performance and a more efficient motor system. Additionally, the present invention provides better and more effective control over resonant motor and actuator systems. Unlike prior systems, the present invention does not require any external sensors, components and/or circuits to determine motor or actuator performance to monitor and control the driving frequency of a motor or actuator. Instead, the present invention provides a drive frequency control for resonant actuator systems which can automatically and continuously determine the operational mechanical resonant frequency of the actuator by monitoring at least one parameter of the actuator device and the direct driving system. This control provided by the present invention adjusts the drive frequency to match operational mechanical resonant frequency, regardless of how the operational mechanical resonant frequency might vary due to temperature fluctuations and/or variation of components within manufacturing tolerances an without external sensors or devices. Further, with the present invention the motor or actuator can directly operate on about three volts while maximizing performance.

DETAILED DESCRIPTION

Figure 1A:
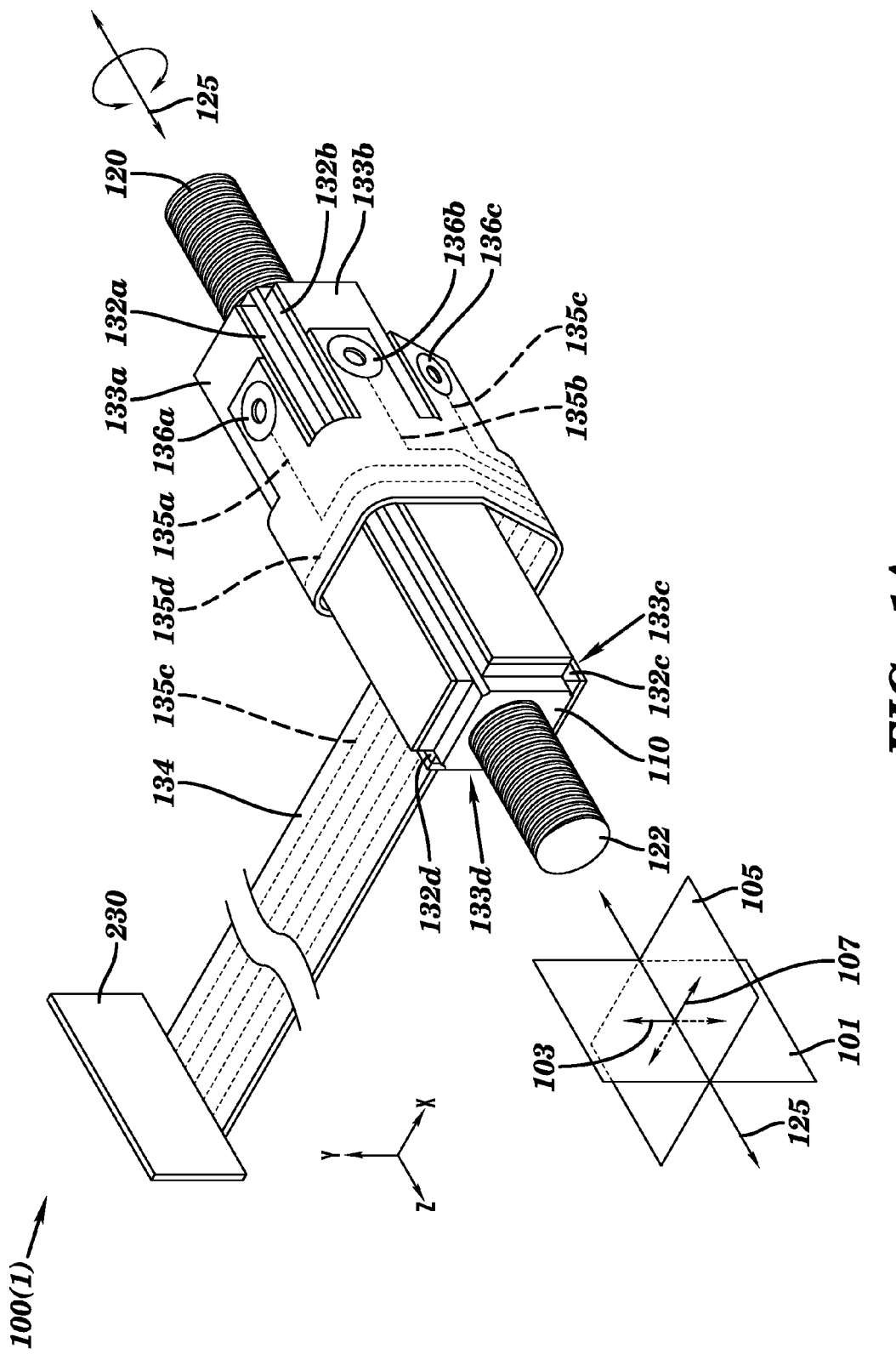
FIG. 1A is a perspective view of a direct drive actuator system in accordance with embodiments of the present invention.

Motor systems and actuator systems have a nominal mechanical resonant frequency, which is dependent on the system's physical structure, materials, and temperature. Motor systems and actuator systems can collectively be referred to as actuator systems or also as actuators. The nominal mechanical resonant frequency of a particular batch of actuator systems can vary from actuator to actuator based on manufacturing mechanical tolerances. In some cases, manufacturing mechanical tolerances can result in two actuators having mechanical resonant frequencies that vary plus or minus two kilohertz. Additionally, actuator temperature changes over time as the actuator heats up and/or as the ambient temperature changes. These temperature changes also affect the actuator's mechanical resonant frequency. As the nominal mechanical resonant frequency of an actuator changes, the changing resonant frequency is referred to as operational mechanical resonant frequency.

Three exemplary drive actuator systems 100(1)-100(3) in accordance with embodiments of the present invention are illustrated and described herein. More specifically, in these three examples the direct drive actuator system 100(1) is illustrated and described with reference to FIGS. 1A, 1B, and 2, the resonant drive actuator system 100(2) is illustrated and described with reference to FIG. 5, and the semi-resonant drive actuator system 100(3) is illustrated and described with reference to FIGS. 8A and 8B. Each of these direct drive actuator systems 100(1)-100(3) mechanically excites the actuator device 102 or 802 in at least a first bending mode. In these examples, the driving systems 230, 530, or 830 mechanically excite the first bending mode of the actuator device 102 or 802 in two orthogonal planes in a cyclic manner. Put another way, the driving systems 230, 530, or 830 cause the actuator device 102 or 802 to bend in a Y-Z plane and in an X-Z plane.

The mechanical response of an actuator device 102 or 802 is greatest when the driving system 230, 530, or 830 excites a bending mode of the actuator device 102 or 802 with a driving signal having a driving frequency equal to, or close to, the nominal mechanical resonant frequency of the actuator. Thus, maximum performance of actuator systems 100(1)-100(3) is achieved with the greatest mechanical response. However, because the nominal mechanical resonant frequency of the actuator can change with e.g., temperature and manufacturing tolerances, the direct driving systems and the resonant driving systems disclosed herein adjust the driving frequency as the operational mechanical resonant frequency of the actuator changes. Depending on the type and size of the actuator, the driving frequency of the driving signal may for example be between about fifty kilo-hertz and about one hundred eighty kilo-hertz. The following disclosure describes systems and methods for monitoring changes to the operational mechanical resonant frequency and making corresponding changes or adjustments to the driving frequency to improve and/or maximize the performance and efficiency of the actuator systems.

The direct driving systems and the resonant driving systems disclosed herein can be used to drive a variety of actuators including, but not limited to, linear motor systems, rotary motor systems, semi-resonant actuator systems, and ultrasonic motor systems. It is to be understood that any of the above mentioned variety of actuators can be driven by both the direct driving systems and the resonant driving systems disclosed herein, unless otherwise specified below.

The exemplary direct driving system 230, resonant driving system 530, and semi-resonant driving system 830 disclosed herein can be used to maximize the performance and the efficiency of a variety of actuator devices, such as exemplary actuator devices 102 and 802. For a given input power the resonant driving system 530 yields higher actuator performance than a direct driving system 230 operating at the same input power. Thus, a first actuator device 102 driven by the resonant driving system 530 operating at the same performance level (e.g., speed, push force) as a second actuator device 102 driven by the direct driving system 230 requires less input power. That is, in the above scenario, the resonant driving system 530 is more efficient than the direct driving system 230. A few non-limiting examples of actuator systems 100(1)-100(3) with the direct driving system 230, the resonant driving system 530, or the semi-resonant driving system 830 are discussed below, but it will become apparent to those skilled in the art that aspects of the following disclosure can be applied to any similar actuator or motor system with other types of driving systems and actuator devices.

Figure 1B:
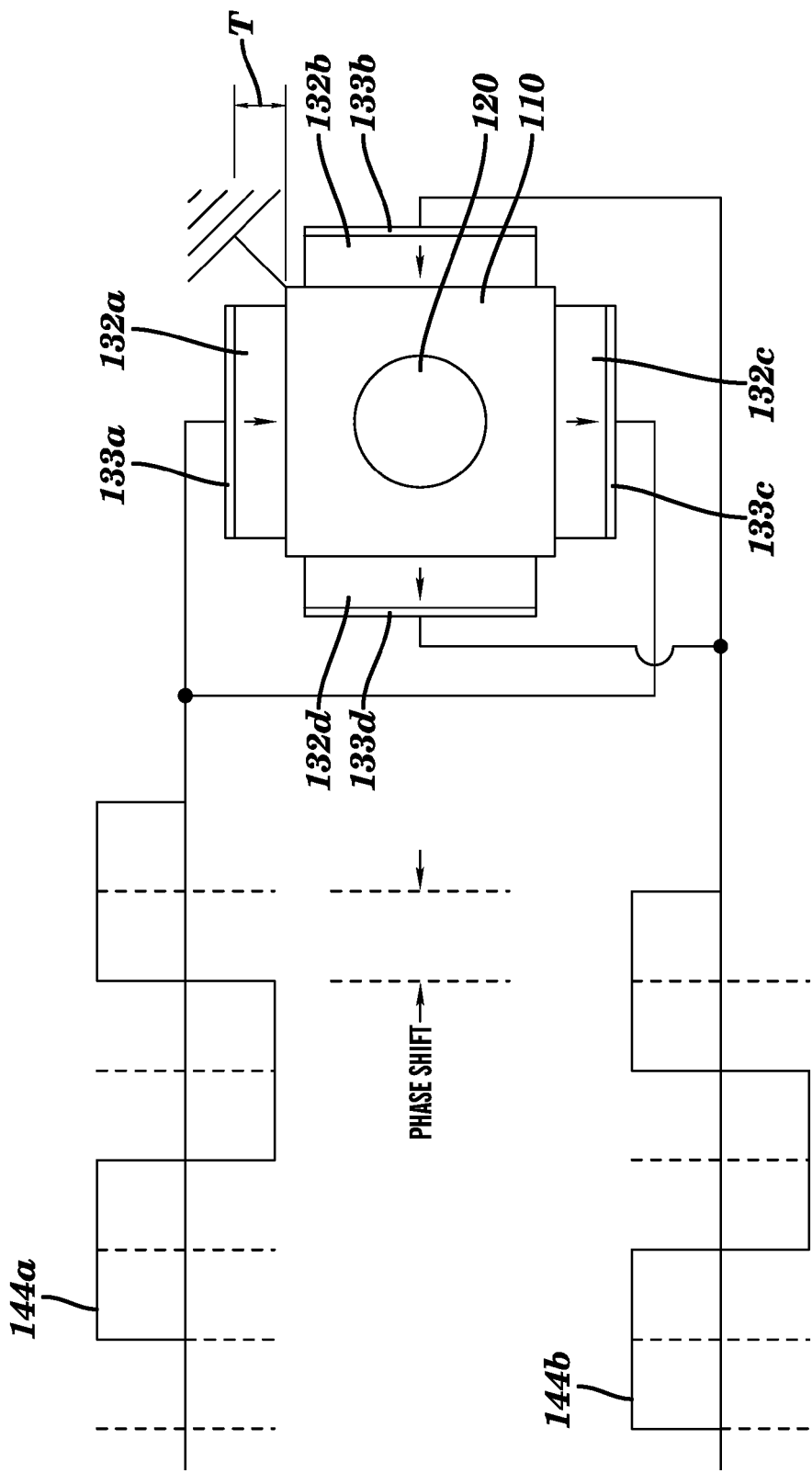
FIG. 1B is a cross-sectional side view of the direct drive actuator system of FIG. 1A being driven by two driving signals.

Referring more specifically to FIGS. 1A and 1B, the direct drive actuator system 100(1) is illustrated in accordance with embodiments of the present invention. The direct drive actuator system 100(1) includes the actuator device 102 comprising an element 110 with a threaded passage, a threaded shaft 120, and a direct driving system 230 (shown in FIG. 2), although the direct drive actuator system 100(1) can include other types and numbers of systems, devices, and components which are connected in other manners. The present invention provides a controller 140 in the direct driving system 230 for maximizing the performance and efficiency of the direct drive actuator system 100(1).

The actuator device 102 generates a force to move a load (e.g., an optical lens) in a linear direction, although it is contemplated that the actuator device 102 can move other types of loads in other directions. The inner passage of the element 110 can be partially threaded or threaded throughout. The threaded shaft 120 can be screwed into position within the threaded passage of the element 110. The threaded shaft 120 has an axis of rotation 125 about which the threaded shaft 120 rotates. The threaded shaft 120 also translates in a direction along the axis of rotation 125. The threaded shaft 120 can include at least one rounded end 122 to reduce frictional forces and aid in applying the force to move the load, although other types of ends can be used.

In addition to the element 110 and the threaded shaft 120, in this example four piezoelectric members 132a-132d comprise part of the actuator device 102, although the actuator device 102 can include other types and numbers of systems, devices, and components and the piezoelectric members can comprise part of the direct driving system instead of the actuator device in other embodiments. Each piezoelectric member 132a-132d is configured to change length upon being subjected to a voltage differential across its thickness T. Specifically, the piezoelectric members 132a-132d can expand and/or contract in the direction along the axis of rotation 125 of the threaded shaft 120. Other actuator devices that provide a force to move a load are contemplated, including by way of example only an actuator device comprising two piezoelectric members and an actuator device comprising a single piezoelectric member.

Each of the piezoelectric members 132a-132d comprise a single layer or plate of piezoelectric material. An electrode 133a-133d is coupled to a top surface of one of the piezoelectric members 132a-132d, respectively. The electrodes 133a-132d can be attached to the piezoelectric members 132a-132d using various glues, adhesives, and/or welding, although other manners for electrically coupling the electrodes 133a-133d to the piezoelectric members 132a-132d can be used. A bottom surface of each of the piezoelectric members 132a-132d is rigidly attached to a corresponding outer surface of the element 110. The piezoelectric members 132a-132d can be attached to the element 110 using various glues, adhesives, and/or welding, although other manners for attaching the piezoelectric members 132a-132d can be used.

The flex circuit 134 also can be referred to as an electrical coupler, although other types of electrical coupling systems can be used. The flex circuit 134 electrically couples the electrodes 133a-133d positioned on top of each piezoelectric member 132a-132d with the controller 140 in driving system 230. The flex circuit 134 is configured to be bent and/or wrapped around the element 110 such that conductive terminals 136a-136d electrically couple to the piezoelectric members 132a-132d via the electrodes 133a-133d. The flex circuit 134 can be predisposed to bend at certain locations to aid in wrapping the flex circuit 134 around the piezoelectric members 132a-132d and the element 110. The flex circuit 134 comprises five conductive traces 135a-135e that carry at least two different driving signals 144a-144b to the various conductive terminals 136, although other amounts and numbers of conductive traces and driving signals are contemplated, such as four driving signals as illustrated and described with reference to FIGS. 8A and 8B. For example, the flex circuit 134 can comprise four conductive traces, wherein each conductive trace carries one of the driving signals. The driving signals 144a-144b may also be referred to as electrical signals, voltage signals, square-wave signals, or other types of input signals.

The controller 140 has two signal outputs which in this example provide square-wave driving signals $144a_2$-$144b_2$ to the driver assembly 260, although other types and numbers of signal outputs to other systems, devices and assemblies can be used. Each of the two signal outputs $144a_2$-$144b_2$ are electrically coupled through the driver assembly 260 to one of the conductive traces 135a-135d in the flex circuit 134 to distribute one or more of the driving signals 144a-144b. According to some embodiments, the fifth conductive trace 135e of the flex circuit 134 is coupled to the element 110 and a bottom surface of each of the piezoelectric members 132a-132d to ground. The grounding of the bottom surfaces of the piezoelectric members 132a-132d allow the direct driving system 230 to apply a voltage potential across the thickness T of each piezoelectric member 132a-132d. The voltage potential causes the piezoelectric members 132a-132d to expand and/or contract thereby oscillating the element 110 and driving the threaded shaft 120 in the direction along the axis of rotation 125.

Each of the conductive traces 135a-135e can be positioned such that each conductive trace 135a-135e electrically attaches to a different conductive terminal 136a-136e. The illustrated paths of the conductive traces 135a-135e are by way of example only and not intended to limit the actual layout of the paths of the conductive traces 135a-135e.

As shown in FIG. 1B, the driving signals 144a-144b are transmitted to respective piezoelectric members 132a-132d. The first driving signal 144a is a square-wave voltage signal that is about 90 degrees out of phase with respect to the second driving signal 144b, which is also a square-wave voltage signal, although other types of signals with other shapes and phase differentials can be used. In this particular example, the first driving signal 144a is transmitted through conductive traces 135a and 135c that are attached via conductive terminals 136a and 136c to the first piezoelectric member 132a and also to the third piezoelectric member 132c. Additionally, in this particular example the second driving signal 144b is transmitted through conductive traces 135b and 135d that are attached via conductive terminals 136b and 136d to the second piezoelectric member 132b and also to the fourth piezoelectric member 132d.

According to some embodiments, the first piezoelectric member 132a and the third piezoelectric member 132c comprise a first pair of opposing piezoelectric members 132a and 132c that operate together; and the second piezoelectric member 132b and fourth piezoelectric member 132d comprise a second pair of opposing piezoelectric members 132b and 132d that operate together. The first driving signal 144a provided to the first pair of opposing piezoelectric members 132a and 132c is phase shifted about 90 degrees relative to the second driving signal 144b provided to the second pair of opposing piezoelectric members 132b and 132d to cause the threaded shaft 120 to rotate and translate in the direction along the axis of rotation 125. A positive 90 degree phase shift produces a positive or forward translation of the threaded shaft 120 along the axis of rotation 125, and a negative 90 degree phase shift produces a negative or backward translation of the threaded shaft 120 along the axis of rotation 125.

The actuator device 102 has a first bending direction and a second bending direction, which is orthogonal to the first bending. Referring in particular to FIG. 1A, the piezoelectric members 132a-132d are positioned about the element 110 such that the first pair of opposed piezoelectric members 132a and 132c bend the element 110 in a first pair of opposed directions in Y-Z plane 101 as indicated by bidirectional arrow 103. In like manner, the second pair of opposed piezoelectric members 132b and 132d bend the element 110 in a second pair of opposed directions in X-Z plane 105 as indicated by bidirectional arrow 107. The first driving signal 144a excites the first pair of piezoelectric members and the second driving signal 144b excites the second pair of piezoelectric members. The frequencies of the driving signals 144a-144b are substantially the same as the nominal mechanical resonant frequency of the element 110 of the actuator device 102. The excitation of the element 110 causes the cyclic orthogonal bending motion in the planes 101 and 105, which in turn causes the threaded shaft 120 to rotate and translate in the direction along the axis of rotation 125. While certain driving signals and phase shifts have been described, it is contemplated that other frequency ranges, shapes, and phase differences of the driving signals 144a-144b are contemplated. Specifically, the direct driving system 230 can increase and/or decrease the driving frequency of the driving signals to increase the performance and efficiency of the actuator device 102. Additionally, while certain bending modes of the actuator device 102 have been described, these bending modes are by way of example only, the present invention is not limited to any number or type of bending modes as each actuator and/or motor system can have other types and numbers of bending modes.

Figure 2:
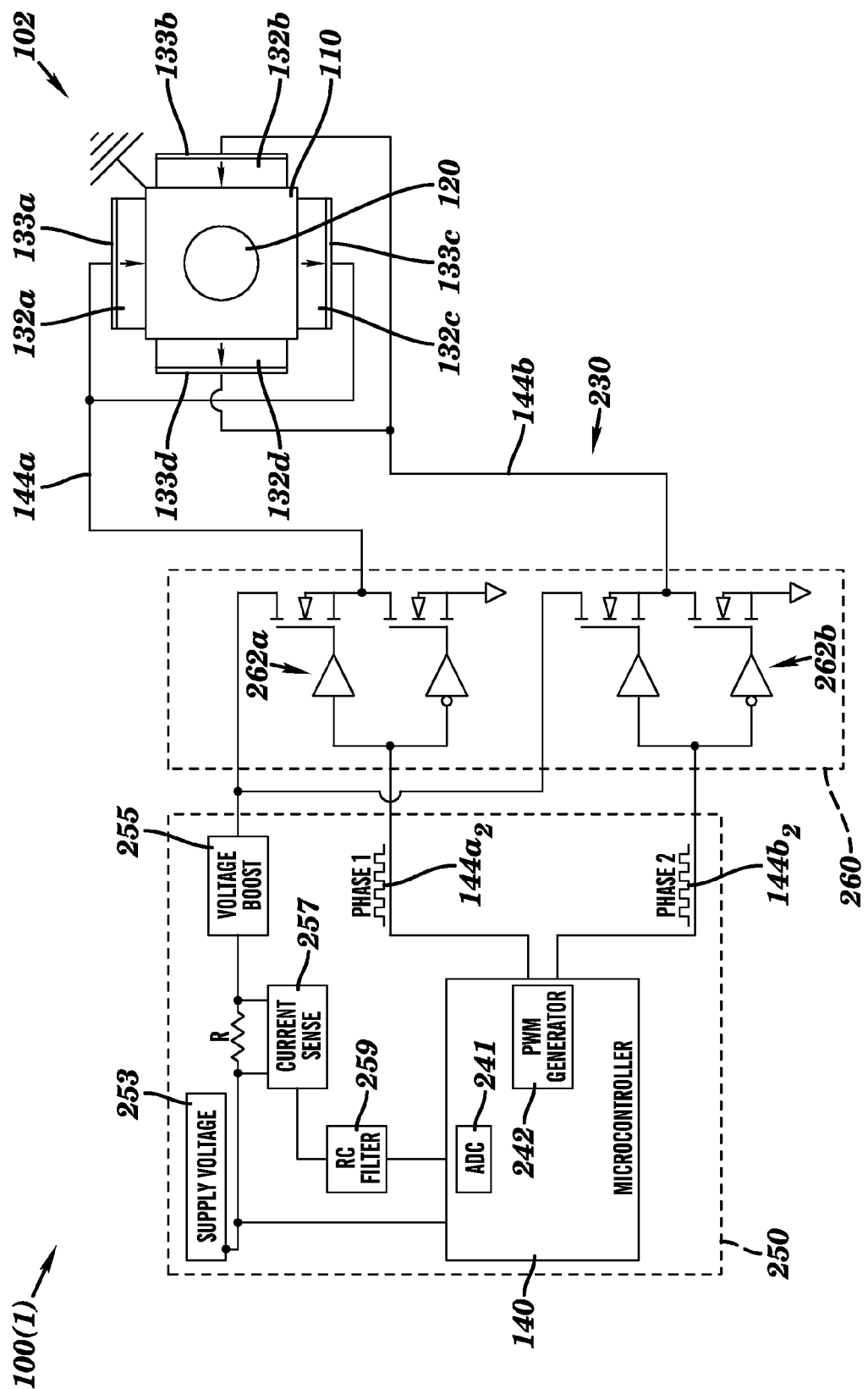
FIG. 2 is a partial circuit and partial block diagram of the direct drive actuator system illustrated in FIGS. 1A and 1B.

Referring to FIG. 2, direct driving system 230 is shown operatively coupled to the actuator device 102. As discussed above, the direct driving system 230 can also be used to drive a variety of different actuator devices including, but not limited to actuator device 102 and also other linear motor systems employing multi-layer piezoelectric plates as described in the aforementioned copending and commonly owned U.S. patent application Publication Ser. No. 12/228,923; rotary motor systems, semi-resonant actuator systems as described in the aforementioned copending and commonly owned U.S. patent application Publication Ser. No. 12/228,943; linear tube motor systems, rotary tube motor systems, and ultrasonic motor systems. The direct driving system 230 can reside on a motherboard or computer chip. The direct driving system 230 comprises a controller board or actuator controller system 250 and a driver assembly 260, although other numbers and types of boards or chips can be used. The driver assembly 260 can also be referred to as an actuator driver or a motor driver.

The actuator controller system 250 includes a processing system or controller 140, a supply voltage or voltage source 253, a voltage boost 255, a current sensor 257, and a filter 259, although the actuator controller system 250 can include other types and numbers of systems, devices, and components which are connected in other manners. The controller 140 can be a processor, a microprocessor, a microcontroller, a digital signal processor or other controller motherboard, although other numbers and types of controllers can be used The voltage source 253 is a battery that supplies power to run, for example, the actuator device 102 and the various onboard electronics (e.g., controller 140), although other types and numbers of power supplies can be used. In this example, the voltage source 253 can supply a voltage of approximately 1.5 volts to approximately 3.3 volts, although other ranges of voltages could be supplied and used. The voltage boost 255 is coupled between the voltage source 253 and the driver assembly 260. The voltage boost 255 increases or boosts the supply voltage from the voltage source 253 to at least about 25 volts, although the voltage boost 255 can increase the supply voltage to approximately 40 volts or to other amounts for other applications.

The current sensor 257 is coupled between the voltage source 253 and the voltage boost 255 and monitors current usage of the driver assembly 260. The current sensor 257 detects an analog voltage drop across resistor R which is proportional to the current drawn across the resistor R by the driver assembly 260 for a fixed operating speed of the actuator device 102 and the direct driving system 230. Thus, the voltage drop can be used to calculate the current drawn by the actuator device 102 and the direct driving system 230 using a multiplier.

The resistor R can have a resistance from about 0.025 ohms to about 1 ohms, although other ranges for the resistance and other types and numbers of resistors in other combinations can be used, depending upon the expected current usage. As the resistance of resistor R increases, the voltage drop across the resistor R increases, which increases the sensitivity of the current sensor 257. However, a larger voltage drop may require a more powerful voltage source to maintain a sufficient power supply to run the direct drive actuator system 100(1) and the onboard electronics. The current sensor 257 also is coupled to the filter 259, which removes the AC drive frequency component, although other configurations can be used, such as having the current sensor 257 directly coupled to the controller 140 without a filter.

The controller 140 is directly coupled to the voltage source 253 and to the filter 259, although the controller 140 could have other types and numbers of connections. The controller 140 includes an analog-to-digital converter 241 ("ADC") and a pulse width modulated ("PWM") signal generator 242, although the controller 140 can include other types and numbers of systems, devices, assemblies, and components in other configurations, such as a master clock described later herein. The analog-to-digital converter 241 receives the analog voltage signal as an input from the filter 259 and converts that analog voltage signal into a digital voltage value. The pulse width modulated signal generator 242 is coupled to the driver assembly 260. The pulse width modulated signal generator 242 generates at least two low-voltage driving signals $144a_2$ and $144b_2$ which are used to drive the piezoelectric members 132a and 132c and the piezoelectric members 132b and 132d, respectively, although the pulse width modulated signal generator 242 could generate other numbers and types of signals, such as four driving signals which are out of phase with each other.

In this example, the controller 140 uses a multiplier, the value of which is based on sensor resistor R and type of current sensor electronics 257, to convert the digital voltage value into a digital current value, which is used to determine a driving frequency of the two low-voltage driving signals $144a_2$ and $144b_2$. The controller 140 can use the digital current value, a plurality of digital current values, or an average digital current value to determine if an adjustment to the drive frequency is getting closer or farther from the operational mechanical resonant frequency of the actuator device 102. Put another way, the controller 140 can cause the PWM signal generator 242 to adjust a driving frequency of a generated signal (e.g., low-voltage driving signals $144a_2$ and $144b_2$) up or down based at least in part on digital current values.

The driver assembly 260 includes a first and a second half bridge drive circuit 262a-262b, although the driver assembly 260 can include other numbers and types of systems, devices, assemblies, and components in other configurations. The first PWM driving signal $144a_2$ is transmitted into the first half bridge drive circuit 262a. Power from the voltage boost 255 feeds the first half bridge drive circuit 262a according to the frequency and duty cycle of the PWM driving signal $144a_2$, which increases the amplitude or peak-to-peak voltage of the first PWM driving signal $144a_2$. Similarly, the second PWM driving signal $144b_2$ is transmitted into the second half bridge drive circuit 262b. Power from the voltage boost 255 feeds the second half bridge drive circuit 262b according to the frequency and duty cycle of the PWM driving signal $144b_2$, which increases the amplitude or peak-to-peak voltage of the second PWM driving signal $144b_2$.

Although half bridge drive circuits have been described, it is contemplated that the first and second PWM driving signals $144a_2$ and $144b_2$ can be transmitted to respective first and second full bridge drive circuits. One of the advantages of using full bridge drive circuits is that the effective voltage differential across the positive electrode and negative electrode of each of the piezoelectric members (e.g., piezoelectric members 132a-132d) is twice the supply voltage, which effectively doubles the mechanical output as compared with a half bridge circuit with the same supply voltage, which saves space. U.S. patent application Ser. No. 12/228,923, entitled, "Reduced-Voltage, Linear Motor Systems and Methods Thereof" provides additional description of the full bridge drive circuit. Since the components and operation of half bridge drive circuits and full bridge drive circuits are well known to those of ordinary skill in the art, they will not be described in greater detail herein.

The controller 140 can cause the PWM generator 242 to generate driving signals of various frequencies, pulse widths and phase. For example, the PWM generator 242 can generate a first signal having frequency A, pulse width A, and phase A, and generate a second signal having frequency A, pulse width A, and phase B. In some embodiments, phase A is shifted about ninety degrees with respect to phase B, although other amounts of phase shifting can be used. According to some embodiments, the ninety degree phase shift between the first and second driving signals 144a-144b causes the element 110 to orbit the threaded shaft 120 at the mechanical resonant frequency of the element 110. The orbiting of the element 110 generates torque that rotates the threaded shaft 120 that moves the threaded shaft 120 linearly in the direction along the axis of rotation 125.

Figure 3:
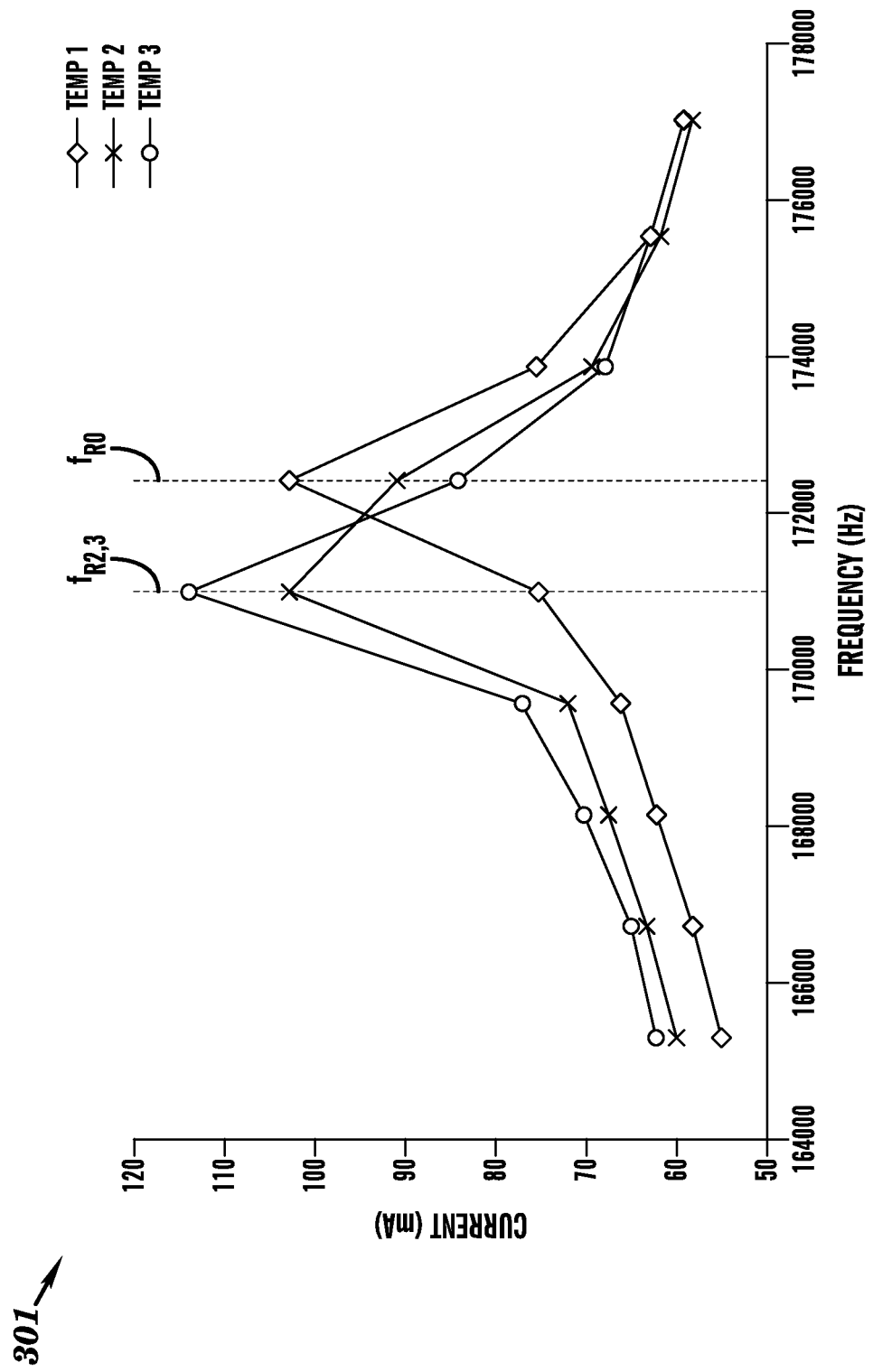
FIG. 3 is a graph of frequency versus current that illustrates a change in peak current as temperature increases according to some embodiments of the present invention.

Referring to FIG. 3, a chart of frequency versus current drawn 301 is shown that illustrates two general principles. Namely, when using direct driving system 230 to drive an actuator device 102: (1) the actuator device 102 and the direct driving system 230 draws maximum current when the driving frequency of the driving signal is equal to or close to the operational mechanical resonant frequency of the actuator and (2) an increase in actuator temperature reduces the operational mechanical resonant frequency of the actuator, thereby shifting the maximum current peak.

The size and shape of an actuator device affects the actuator's temperature coefficient, although other factors can affect the temperature coefficient. Actuator devices having different temperature coefficients can exhibit different frequency versus current relationships than those shown in FIG. 3; however, the two general principles still apply. For example, in an actuator device 102 operating at 1.8 volts including an element having cross-sectional dimensions of about 1.8 mm×1.8 mm and a length of about six mm, the actuator device 102 has a temperature coefficient of about negative forty hertz per degrees Celsius (−40 Hz/° C.). Thus, the operational resonant frequency of the actuator device 102 decreases about 40 Hertz for every one degree Celsius increase in temperature. Various other types and sizes of actuator devices having various temperature coefficients are contemplated as exhibiting the same two general principles. Accordingly, FIG. 3 serves as an example that illustrates how changes in the temperature and/or ambient temperature of an actuator device can affect an operational mechanical resonant frequency of the actuator device over time.

Referring more specifically to FIG. 3, three different plots taken at three different times of the example above of the actuator device 102 driven by the direct driving system 230 are illustrated. Temp 1 illustrates that the maximum current drawn on startup of the motor is about 103 milliamps at a driving frequency $f_{Ro}$, which is about 172.5 Kilohertz. Temp 2 illustrates that the maximum current drawn after warming up the motor is about 103 milliamps at a driving frequency $f_{R2}$, which is about 171 kilohertz. Temp 3 illustrates that the maximum current drawn at steady state operation of the motor increased to about 112 milliamps at a driving frequency $f_{R3}$, which is about 171 kilohertz. Thus, over time as the actuator device 102 in this example heats up, the operational mechanical resonant frequency of the actuator device 102 decreases and the current drawn by the actuator device 102 and the direct driving system 230 also decreases unless the driving frequency is tracking the mechanical resonant frequency.

To maximize performance and efficiency of the actuator device 102 driven by the direct driving system 230, the controller 140 in the direct driving system 230 monitors the current drawn by the actuator device 102 and the direct driving system 230 and compares the current drawn over time with average usages of previously drawn current. Based on the comparison of current usages, the controller 140 can estimate the operational mechanical frequency of the actuator device 102. Depending on whether the operational mechanical resonant frequency is less than, greater than, or about the same as the nominal or previously determined operational mechanical resonant frequency, the controller 140 adjusts the driving frequency of the two low-voltage driving signals 144$a_2$ and 144$b_2$, although the controller 140 can modify other aspects of the same or different signals. For the exemplary actuator device 102 described earlier for which the data of FIG. 3 is provided, the adjustment range of the direct driving system 230 is between about 166 kilohertz and about 176 kilohertz. In general, for any given actuator device, the adjustment range of the direct driving system will be within ±3 percent of the operational mechanical resonant frequency of the actuator device. Depending upon the design of the resonant actuator device, the operational mechanical resonant frequency may vary widely, such as between about 20 kilohertz and about one megahertz by way of example.

The controller 140 monitors the current usage of the actuator device 102 and the direct driving system 230 and maximizes motor performance and efficiency by adjusting and/or stepping the driving frequency to be closer to the frequency that results in maximum current usage. Put another way, when using a direct driving system 230, performance and efficiency of the actuator device 102 are maximized when the actuator device 102 is driven with driving signals 144$a$-144$b$ at a driving frequency as close as possible to the operational mechanical resonant frequency of the actuator device 102. The drive frequency step size determines how close the drive frequency can get to the operational mechanical resonant frequency. Drive frequencies can be created by dividing a fixed master clock or oscillator. The higher the master clock frequency, the smaller the drive frequency step and the closer the drive frequency may get to the operational mechanical resonant frequency. Drive frequencies also can be created by direct control of a voltage controlled oscillator or VCO, tuned to the operational frequency range of the actuator, or a combination of a high frequency VCO and division.

The controller 140 described earlier also includes a master clock with a maximum clock frequency. The master clock frequency can range from at least about nine megahertz to at least about forty megahertz, although other clock frequencies can be used, such as a clock frequency of at least about 20 megahertz. The adjustments by the controller 140 to the driving frequency are limited by an available frequency resolution, or an available frequency resolution step size. For example, a controller 140 implementing a twenty megahertz master clock that generates driving signals with a driving frequency of about 171 kilohertz has an available driving frequency resolution of about 1.4 kilohertz. In this example, the controller 140 can adjust the driving frequency to at least be within 700 hertz of the operational mechanical resonant frequency. The available frequency resolution step size of a controller 140 varies with master clock frequency and driving frequency. It is contemplated that various master clock frequencies and various driving frequencies can be implemented to yield many different frequency resolution step sizes. For example, a controller 140 with a master clock frequency of about forty megahertz generating a driving signal at a driving frequency of about 171 kilohertz has an available frequency resolution step size of about seven hundred hertz, although other embodiments can have other frequency resolution step sizes, such as at least about fifty hertz or at least about three hundred hertz by way of example only.

The master clock frequency selection is a compromise between cost, power consumption (since power usage goes up with frequency), and achieving a drive frequency step size that provides a minimum level of performance from the actuator regardless the operational mechanical resonant frequency. The particular frequency resolution can vary based on the particular application. By way of example only, a frequency resolution of no more than about 1.4 kilohertz is sufficient to provide the minimum performance required for a 1.8 motor across the operational temperature range.

In some embodiments where the available master clock frequency is too low to achieve minimal performance requirements because the resulting drive frequency steps size is to large and therefore unable to remain close to the operational mechanical resonant frequency, a phase locked loop or PLL may be used to multiply the master clock. One particular embodiment uses clock a doubler which may be implemented for master clock frequencies at or below 10 megahertz.

Figure 4A:
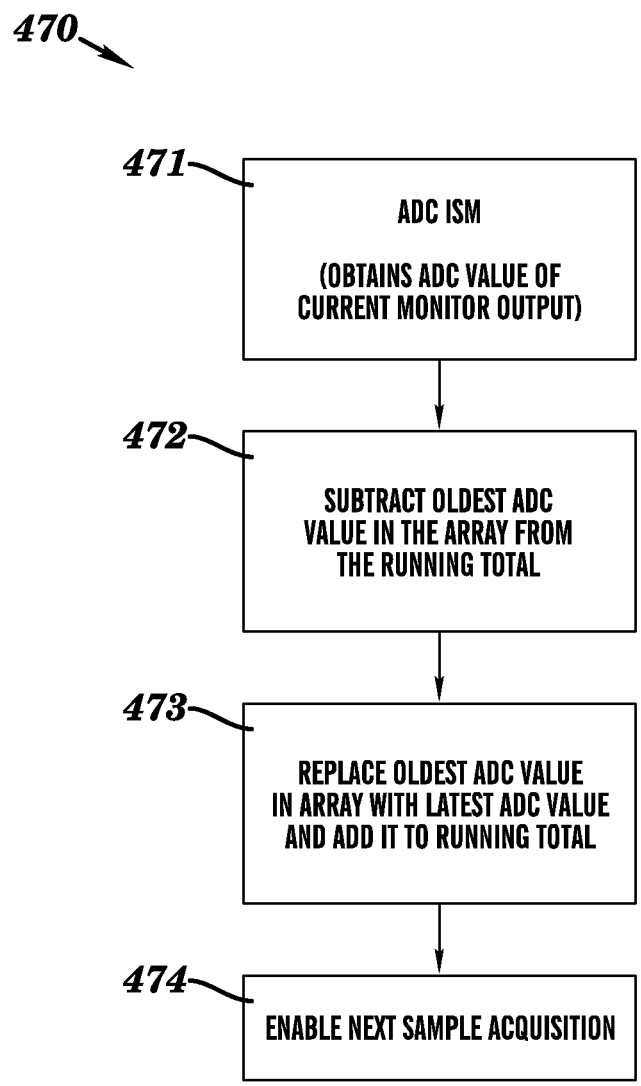
FIG. 4A is a flow chart of an analog-to-digital converter interrupt service method according to some embodiments of the present invention.

Referring to FIGS. 4A-4D, four flow diagrams are shown that illustrate the operation of software and/or firmware in or on the actuator controller system 250 and/or the driver assembly 260. Referring more specifically to FIG. 4A, an exemplary ADC interrupt service method (ISM) 470 is illustrated and described. As discussed above in relation to FIG. 2, the current sensor 257 monitors current usage of the driver assembly 260. The voltage across the current sensor 257 is proportional to the current drawn across the resistor R. In step 471, the ADC 241 periodically receives an analog voltage signal generated by the current sensor 257 and converts that analog voltage into a digital voltage value, also known as an ADC digital voltage value. Once a new digital voltage value is obtained, in step 472 the oldest stored digital voltage value is subtracted from a running total stored in random access memory on the actuator controller system 250. In step 473, the oldest subtracted digital voltage value is then replaced with the new received digital voltage value and added into the running total. Next in step 474, the ADC 241 then awaits its next sample acquisition which depends on a predetermined acquisition time increment.

The running total of digital voltage values includes at least about thirty digital voltage values, although other numbers of digital voltage values can be used, for example, one, ten or twenty. The running total of digital voltage values can be averaged by dividing the running total by the number of samples. The averaging of samples can be used to reduce the effects of noise in the direct driving system 230 and/or in the actuator device 102. The controller 140 obtains a new digital voltage value at least about every twenty microseconds, although the controller 140 can obtain a value more or less frequently, for example, every five microseconds or every one hundred microseconds.

Figure 4B:
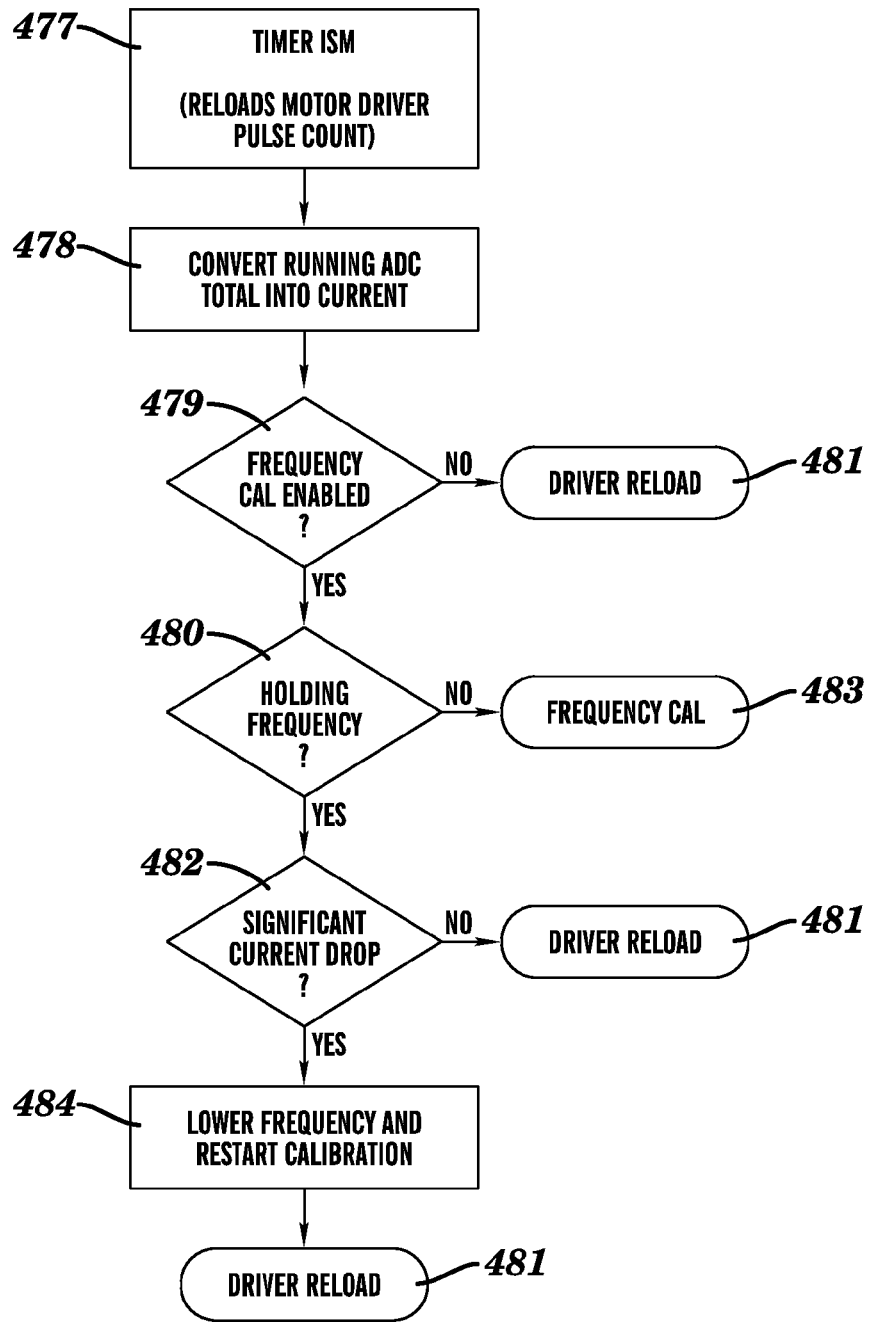
FIG. 4B is a flow chart of a timer interrupt service method according to some embodiments of the present invention.

Referring more specifically to FIG. 4B, an exemplary timer interrupt service method (ISM) 476 is illustrated and described. The actuator controller system 250 discussed above and shown in FIG. 2, has a pulse count register that is reloaded periodically to generate a continuous drive signal. In some embodiments, elements of the actuator controller system 250, such as the PWM generator, are combined with the driver assembly 260 and contain the pulse counter therein. In step 477, the controller 140 begins to perform frequency calibration, if enabled, and reload the pulse count register. In step 478, the controller 140 converts the running total of digital voltage values (e.g., thirty digital voltage values) into a running total of digital current values. The running total of digital current values can be averaged by dividing by the total number of samples (e.g., thirty samples). This average digital current value is about equal to the average current drawn by the driver assembly 260 and actuator device 102 over a predetermined period of time (e.g., twenty microseconds×thirty samples=600 microseconds).

After the running total of digital voltage values is converted into current values, in step 479 the controller 140 determines if frequency calibration is enabled. A user or the controller 140 can turn frequency calibration on or off. In some embodiments, the user turns frequency calibration off to manually adjust the driving frequency. Other reasons for turning frequency calibration are contemplated, such as when ramping the speed of the motor as this affects the current apart from the drive frequency. If in step 479 controller 140 determines the frequency calibration is not enabled, then the No branch is taken to step 481 where the controller 140 immediately reloads a buffer with the previously stored driving frequency and pulse count.

If in step 479 controller 140 determines the frequency calibration is enabled, then the Yes branch is taken to step 480 where the controller 140 determines if the driving frequency is being held, that is awaiting the next calibration time interval. The direct driving system 230 can hold the driving frequency constant for a period of time. In some instances, constantly changing and/or adjusting the driving frequency can reduce actuator performance and actuator efficiency. For example, once the direct driving system 230 finds the operational mechanical resonant frequency of the actuator device 102, the controller 140 adjusts the driving frequency and can put a hold on the new driving frequency. The hold can be for a predetermined amount of time, for example, thirty seconds, or the hold can be until the controller 140 detects a predetermined increase or decrease in current usage by the driving circuit 260. If in step 480 the controller 140 determines the driving frequency is not being held, then the No branch is taken to step 483 where the controller 140 calibrates the driving frequency as illustrated and described herein with reference to FIG. 4C.

If in step 480 the controller 140 determines the driving frequency is being held, then the Yes Branch is taken to step 482 where the controller 140 determines if there is a significant drop in current usage. A significant drop of current usage can indicate that the actuator device 102 is not operating at peak performance and maximum efficiency because the operational mechanical resonant frequency of the actuator device 102 changed. If in step 480 the controller 140 determines there is no significant drop in current usage, then the No branch is taken to step 481 where the controller 140 immediately reloads a buffer with the previously stored driving frequency and pulse count. If in step 480 the controller 140 determines there is a significant drop in current usage, then the Yes branch is taken to step 484. In step 484, even though there is a hold on the frequency, the controller 140 lowers the driving frequency and restarts calibration. The controller 140 default state lowers the driving frequency because a significant drop in current typically indicates a reduction of the operational mechanical resonant frequency of the actuator device 102. A significant drop in current can be at least about five milliamps, but this can vary between motor types. Next following the lowering of the driving frequency and the restarting of calibration in step 484, in step 481 the controller 140 immediately reloads a buffer with the previously stored driving frequency and pulse count.

Referring back to FIG. 3, as the motor warmed up, the operational mechanical resonant frequency decreased from about 172.5 kilohertz to about 171 kilohertz. Comparing the Temp 1 plot to the Temp 2 plot illustrates this point. Initially, the maximum current usage was at $f_{R0}$, which is at about 172.5 kilohertz. Later on in time, the maximum current usage was at $f_{R2}$, which is at about 171 kilohertz. The maximum current usage initially was at about 103 milliamps. Continual monitoring of current usage of the driver board, while keeping the driving frequency at about 172.5 kilohertz indicates that the maximum current would drop to about 91 milliamps. Further comparison with the Temp 3 plot indicates that maintaining the driving frequency at about 172.5 kilohertz results in the maximum current usage dropping to about 84 milliamps. Each of these drops in current usage indicates that the operational mechanical resonant frequency changed. Changes of operational mechanical resonant frequency in typical actuator device initially are the result of increases in temperature due to the actuator device warming up. As the temperature of the actuator device rises, the operational mechanical resonant frequency decreases. Thus, default of the timer ISM 476 executed by the controller 140 is in step 484 to lower the driving frequency after detecting in step 482 a significant drop of current. After lowering the driving frequency and restarting calibration in step 484, the controller 140 loads the buffer with the new driving frequency and pulse count in step 481.

Figure 4C:
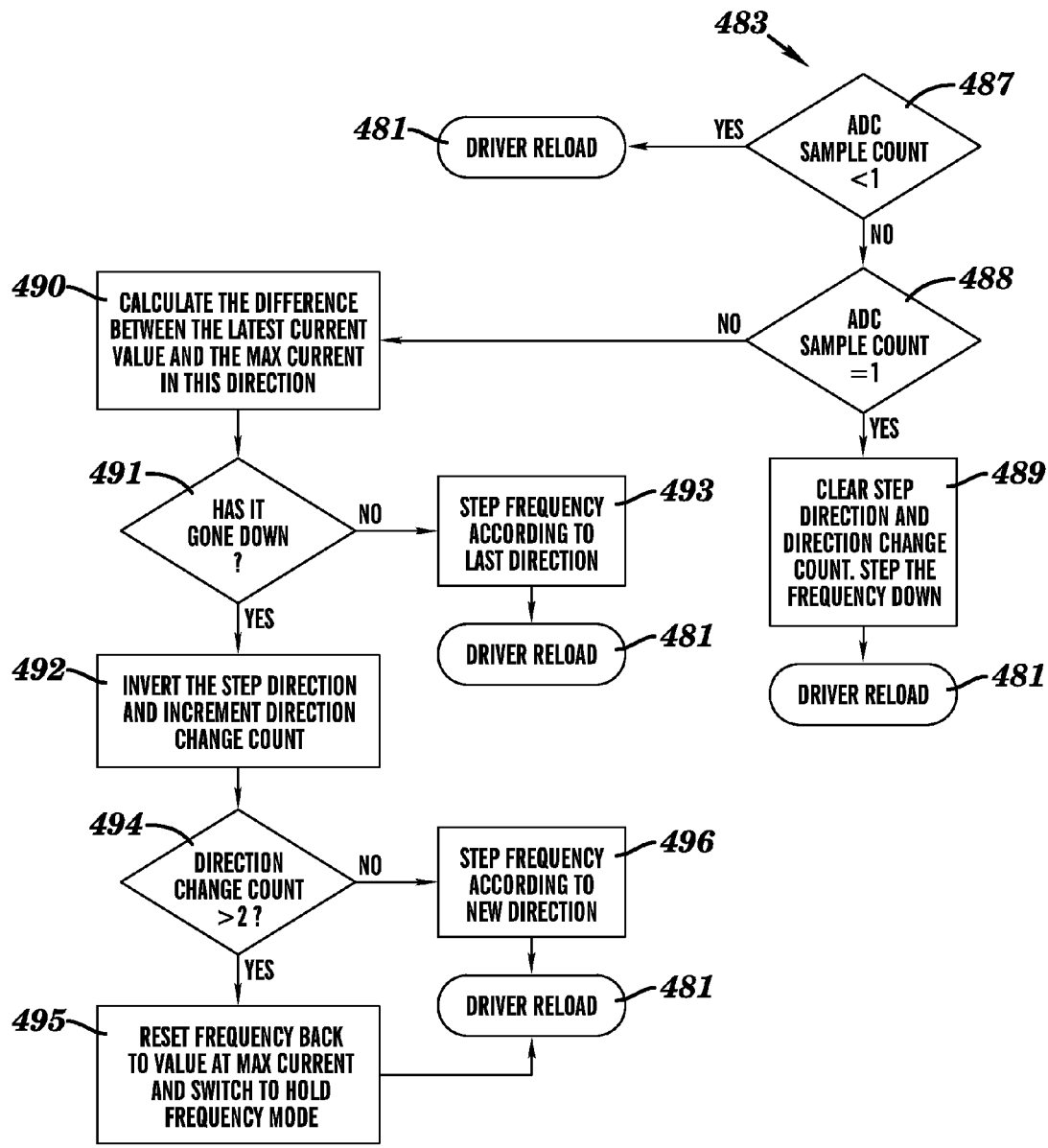
FIG. 4C is a flow chart of a frequency calibration method according to some embodiments of the present invention.

Referring to FIG. 4C, a flow chart is shown that illustrates in greater detail the driving frequency calibration method of step 483. Referring also to FIG. 4B, if in step 479 frequency calibration is enabled and the driving frequency is not held in step 480, then in step 483 the controller 140 will calibrate the driving frequency. Initially, in step 487 the controller 140 checks an ADC current sample count. If in step 487 the controller 140 determines the current sample count is less than one, then the Yes branch is taken to step 481 where the controller 140 reloads the buffer with the previously stored driving frequency and pulse count because the controller 140 needs at least two current samples for comparison. The current sample is the average digital current value discussed above in relation to FIG. 4B. It is contemplated that instead of analyzing and/or comparing electrical current values to determine changes in the operational mechanical resonant frequency, the controller 140 can analyze and/or compare other types of values, such as peak-to-peak voltage values, power values, impedance values, or any combination thereof.

If in step 487 the controller 140 determines the ADC current sample count is not less than one, then the No branch is taken to step 488 where the controller 140 determines if the ADC current sample count is equal to one. If in step 488, the controller 140 determines the ADC current sample count is equal to one, then the Yes branch is taken to step 489 and a step direction and a direction change count are cleared. The change direction count tracks the number of times the controller 140 changes the step direction. The step direction determines whether the driving frequency will be increased or decreased. For example, referring to FIG. 3, if the step direction is downward, the initial driving frequency $f_{Ro}$ will be reduced from 172.5 kilohertz by the frequency resolution step size of the controller 140, which results in a lower driving frequency (e.g., 171.1 kilohertz). Similarly, if the step direction is upward, the driving frequency will be increased from 172.5 kilohertz by the frequency resolution step size of the controller 140, which results in a higher driving frequency (e.g., 173.9 kilohertz).

An ADC current sample count equal to one typically means that the actuator device 102 was just turned on and that the step direction and direction change count, which affect the frequency calibration in step 483, should be initialized. Initializing the direction change count sets the counter to zero. Initializing the step direction in step 489 sets the step direction downward, which incrementally decreases the driving frequency by the frequency resolution of the controller 140, although initializing the step direction can change the step direction to upward in other embodiments. The step direction in step 489 initially is set downward because operational temperature of most actuator devices increase due to the actuator device warming up, which decreases the operational resonant frequency of the actuator device, although the step direction could be set upward in other embodiments. Once the driving frequency is lowered, then in step 481 the controller 140 reloads the buffer with the new driving frequency and pulse count. According to other embodiments, initializing the step direction sets the step direction upward, which incrementally increases the driving frequency by the frequency resolution step size of the controller 140.

If in step 488 the controller 140 determines the ADC current sample count is not equal to one, that indicates there are at least two ADC current samples available for comparison and the No branch is taken to step 490. One of the at least two current samples is a maximum recorded current sample. In step 490, the controller 140 calculates the difference between the latest current sample with the maximum recorded current sample in the same step direction (e.g., down).

In step 491, the controller 140 determines if the latest current sample has decreased. If in step 491 the controller 140 determines the latest current sample has decreased, then the Yes branch is taken to step 492 where the step direction is changed and the direction change counter is incremented. For example, if the initial step direction is downward, then in step 492 the controller 140 will change the direction to upward. If in step 491 the controller 140 determines the latest current sample has remained constant or increased, then the No branch is taken to step 493 where the driving frequency is stepped by the frequency resolution of the controller 140 according to the previously stored step direction (e.g., downward). After the driving frequency is stepped according to the last direction in step 493, then the controller 140 reloads the buffer with the new driving frequency and pulse count in step 481.

If in step 491 the controller 140 determines the latest current sample has gone down, then after the step direction is inverted and the direction change count is incremented in step 492), the controller 140 determines in step 494 if the direction change count is greater than two. If in step 494 the controller 140 determines the direction change count is greater than two, then yes branch is taken to step 495 where the controller 140 resets the driving frequency to the driving frequency that produced the latest recorded maximum current sample and the direct driving system 230 is switched to the hold driving frequency mode. After the driving frequency is reset by the controller 140 in step 495, the controller 140 reloads the buffer with the new driving frequency and pulse count in step 481. If in step 494 the controller 140 determines the direction change count is less than or equal to two, then the No branch is taken to step 496 where driving frequency is stepped by the frequency resolution of the controller 140 according to the new step direction (e.g., upward). After the driving frequency is stepped according to the new step direction in step 496, then the controller 140 reloads the buffer with the new driving frequency and pulse count in step 481.

Figure 4D:
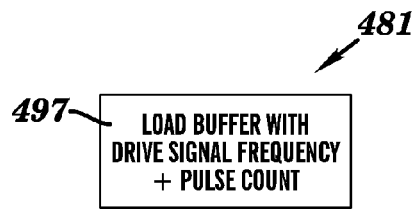
FIG. 4D is a flow chart of a driver reload method according to some embodiments of the present invention.

Referring to FIG. 4D, a flow diagram of the driver reload method of step 481 is shown according to some embodiments. Several scenarios in the timer ISM 476 and the frequency calibration method of step 483 end with the driver reload method of step 481. The driver reload method of step 481 loads the buffer with the frequency of the driving signal and/or period if the frequency changed. The driver reload method of step 481 also reloads the pulse count such that the controller 140 can continuously generate a driving signal (e.g., driving signals 144a-144b). After the buffer is reloaded, the controller 140 continues to run the ADC ISM 470 and the timer ISM 476 periodically to monitor the current and determine whether to further adjust the driving frequency of the driving signals (e.g., driving signals 144a-144b). The controller 140 runs the frequency calibration method of step 483 about every eight hundred microseconds, although the frequency calibration method of step 483 can be run more or less frequently, for example, every four hundred microseconds or every sixteen hundred microseconds.

Figure 5:
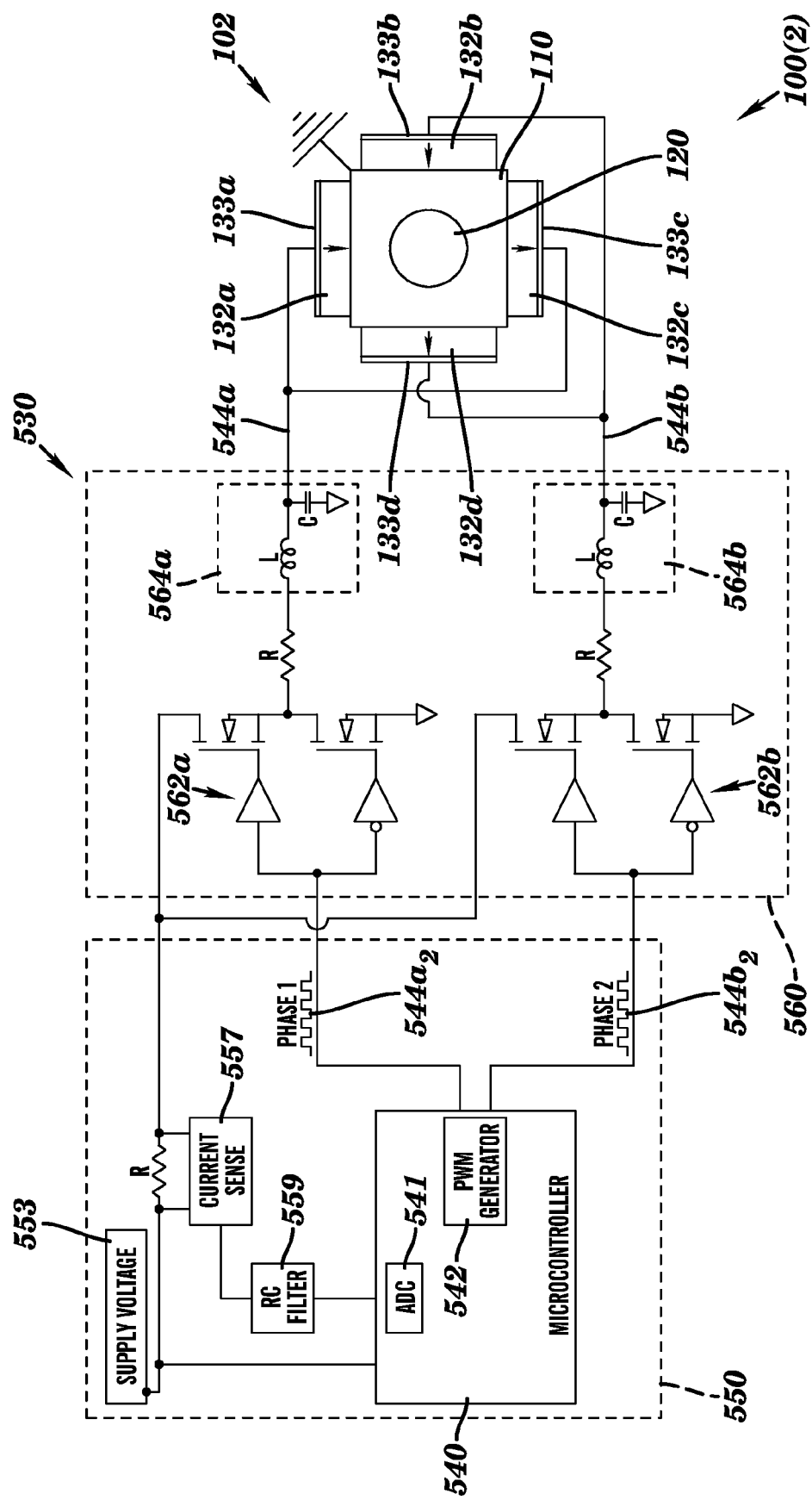
FIG. 5 is a partial circuit and partial block diagram of a resonant drive actuator system in accordance with embodiments of the present invention.

Now referring to FIG. 5, a resonant drive actuator system 100(2) with a resonant driving system 530 operatively coupled to the actuator device 102 which was illustrated and described earlier. As discussed above, the resonant driving system 530 can be used to increase performance and maximize efficiency of the variety of actuator devices including, but not limited to actuator device 102, such as motor systems employing single or other numbers of piezoelectric plates, rotary motor systems, semi-resonant actuator systems, linear tube motor systems, rotary tube motor systems, and ultrasonic motor systems. The resonant driving system 530 uses a driving system that is the same as the direct driving system 230 discussed above in relationship to FIGS. 1A-1B and 2, except as described and illustrated herein. The resonant driving system 530 resides on a circuit board such as a "motherboard," or on a computer chip such as an application specific integrated circuit (ASIC), although other formats for the driving system can be used. The resonant driving system 530 comprises a controller circuit or actuator controller 550 and a driver assembly 560 provided on one or more integrated circuit chips and/or one or more circuit boards, although other numbers and types of boards or chips can be used. The actuator controller 550 and the driver assembly 560 may be contained on a single ASIC chip. The driver assembly 560 can also be referred to as an actuator driver or a motor driver by way of example only.

The actuator controller 550 includes a controller 540, a supply voltage or voltage source 553, a current sensor 557, and a filter 559, although the actuator controller 550 can include other numbers and types of systems, devices, and components, which are connected in other manners. The actuator controller 540 can be a processor, a microprocessor, a microcontroller, a digital signal processor, and/or a motherboard, although other types and numbers of controllers can be used. The voltage source 553 may be provided as a part of the actuator controller 550 and coupled to the controller 540, the current sensor 557, and the driver assembly 560, although the voltage source 553 can be coupled with any number of additional or fewer components. The voltage source 553 is the same as the voltage source 253 described above in relation to FIG. 2.

The current sensor 557 may be provided as a part of the actuator controller 550 and coupled between the voltage source 553 and the driver assembly 560, such that the current sensor 557 monitors current usage of the driver assembly 560. The current sensor 557 is the same as the current sensor 257 described above in relation to FIG. 2. The current sensor 557 detects an analog voltage drop across resistor R, also called an analog voltage signal. The voltage drop across the current sensor 557 is proportional to the current drawn across the resistor R by the driver assembly 560 for a fixed operating speed of the actuator device 102. Thus, the voltage drop can be used to calculate the current drawn by the actuator device 102 and the resonant driving system 530 using a multiplier.

The resistor R can have a resistance from about 0.025 ohms to about 1 ohms, although other ranges for the resistance and other types and numbers of resistors in other combinations can be used depending on the expected current usage. As the resistance of resistor R increases, the voltage drop across the resistor R increases, which increases the sensitivity of the current sensor 557. However, a larger voltage drop may require a higher voltage source to maintain a sufficient power supply to run the actuator device 102 and the onboard electronics. The current sensor 557 also is coupled to the filter 559, which removes the AC drive frequency component, although other configurations can be used, such as having the current sensor 557 be directly coupled to the controller 540 without a filter.

The controller 540 is directly coupled to the voltage source 553, the filter 559, and the driver assembly 560, although the controller can be coupled to other types and numbers of systems, devices, assemblies, and components in other configurations. The controller 540 includes an analog-to-digital converter 541 ("ADC") and a pulse width modulated ("PWM") signal generator 542, although the controller 540 can include other types and numbers of systems, devices, assemblies, and components in other configurations, such as a master clock described later herein. The controller 540 includes an analog-to-digital converter 541 ("ADC") that receives the analog voltage signal as an input from the filter 559 and converts that analog voltage signal into a digital voltage value. The controller 540 also includes a pulse width modulated ("PWM") signal generator 542 that is coupled to the driver board 560. The PWM signal generator 542 generates at least two low-voltage driving signals $544a_2$ and $544b_2$ which are used to drive the piezoelectric members 132a and 132c and the piezoelectric members 132b and 132d, respectively.

The controller 540 uses a multiplier, the value of which is based on sensor resistor R and type of current sensor electronics 557 to convert the digital voltage value into a digital current value, which is used to determine a driving frequency of the two low-voltage driving signals $544a_2$-$544b_2$. The controller 540 can use by way of example the digital current value, a plurality of digital current values, or an average digital current value to determine if an adjustment to the drive frequency is getting closer or further from the operational mechanical resonant frequency of the actuator device 102. Put another way, the controller 540 can cause the PWM signal generator 542 to adjust a driving frequency of a generated signal (e.g., low-voltage driving signals $544a_2$-$544b_2$) up or down based at least in part on digital current values.

The driver assembly 560 includes a first and a second half bridge drive circuit 562a-562b and a first and second tank circuit 564a-564b, although the driver assembly 560 can include other numbers and types of circuits and components connected in other manners, such as full bridge drive circuits and/or four half bridge drive circuits. The first PWM driving signal $544a_2$ is transmitted into the first half bridge drive circuit 562a on the driver board 560. Power from the voltage source 553 feeds the first tank circuit 564a according to the frequency and duty cycle of the low voltage driving signal $544a_2$, which results in the first driving signal 544a. Similarly, the second PWM driving signal $544b_2$ is transmitted into the second half bridge drive circuit 562b on the driver assembly 560. Power from the voltage source 553 feeds the second tank circuit 564b according to the frequency and duty cycle of the low voltage driving signal $544b_2$, which results in the second driving signal 544b.

The first and second tank circuits 564a-564b are also referred to as LC circuits or inductor-capacitor circuits. According to some embodiments, the tank circuits 564a-564b have an electrical resonant frequency close to the nominal mechanical resonant frequency of the actuator device 102. Tank circuits having an electrical resonant frequency within one thousand hertz of the nominal mechanical resonant frequency of the actuator device 102 are contemplated, although other types of circuits with other parameters can be used. The tank circuits 564a-564b can be used to boost the peak-to-peak voltage of the first and second driving signals 544a-544b. The tank circuits 564a-564b recycle energy stored in the bulk capacitance of the actuator device 102. The bulk capacitance of the actuator device 102 includes the capacitance of capacitor C and the capacitance of the piezoelectric members 132a-132d. Recycling the bulk capacitance of the actuator device 102 increases the efficiency of the actuator device 102. Additionally, recycling of the energy produces the first and second driving signals 544a-544b having peak-to-peak voltages of at least about fifty volts depending upon the electrical Q of the circuit, although the recycling of the energy can produce driving signals having greater or lower peak-to-peak voltages, such as, for example, at least about one hundred volts and/or at least about two hundred volts.

Figure 6:
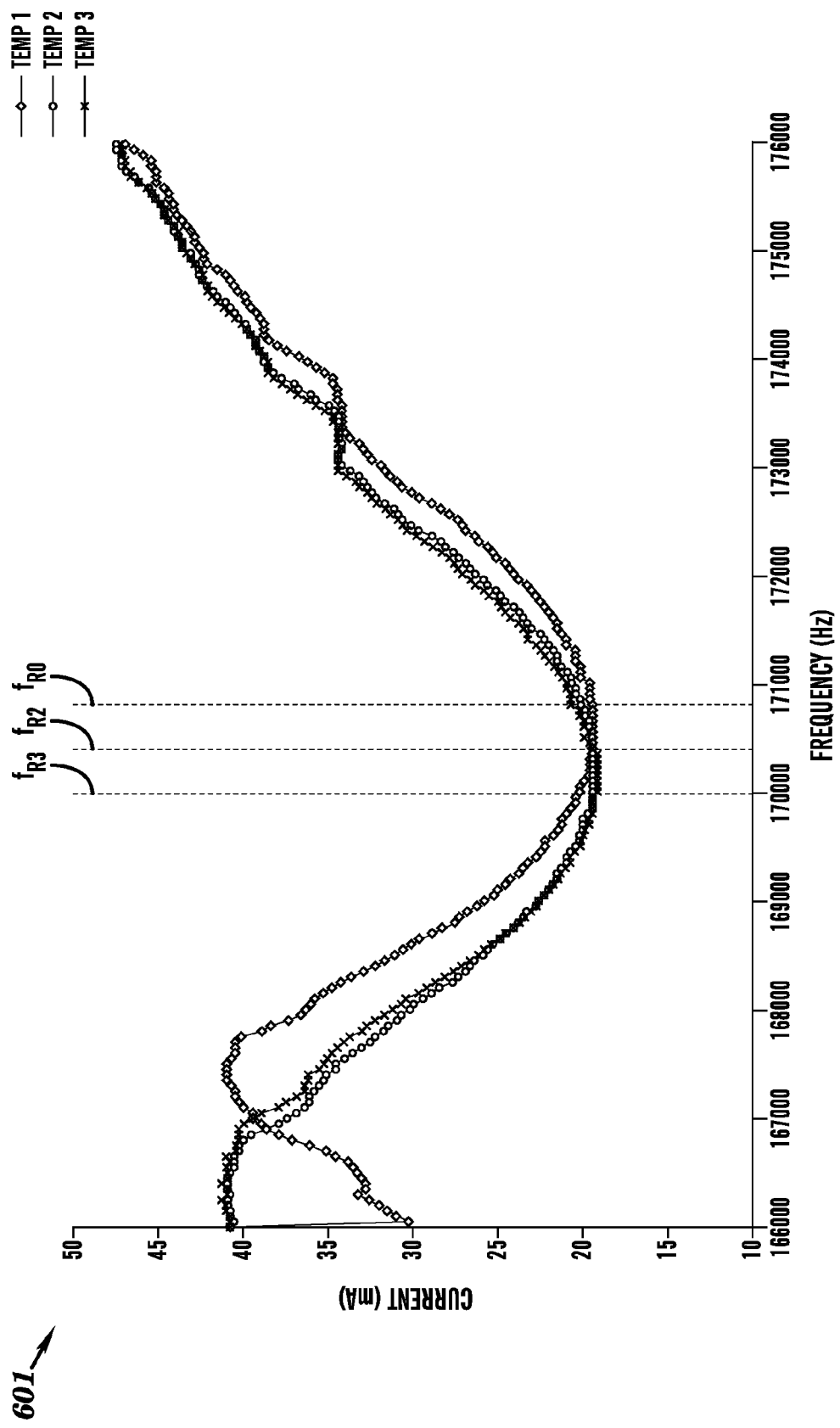
FIG. 6 is a graph of frequency versus current that illustrates a change in minimum current as temperature increases according to some embodiments of the present invention.

Referring to FIG. 6, a graph 601 of frequency versus current drawn is shown that illustrates two general principles. Namely, when using resonant driving system 530 to drive an actuator device 102: (1) the actuator device 102 and resonant driving system 102 draws minimum current when the driving frequency of the driving signal is equal to, or close to, the operational mechanical resonant frequency of the actuator device 102 and (2) an increase in temperature of the actuator device 102 reduces the operational mechanical resonant frequency of the actuator device 102, thereby shifting the minimum current peak.

According to some embodiments, the size and shape of an actuator device affects the temperature coefficient of the actuator device. Actuator devices having different temperature coefficients can exhibit different frequency versus current relationships than those shown in FIG. 6; however, the two general principles still apply. For example, in an actuator device 102 including an element 110 having cross-sectional dimensions of about 3.4 mm×3.4 mm and a length of about 10 mm (i.e., a 3.4 linear motor), the actuator device 102 has a temperature coefficient of about negative twenty-seven hertz per degrees Celsius (−27 Hz/° C). Thus, the operational resonant frequency of the actuator device 102 decreases about 27 hertz for every one degree Celsius increase in temperature. Various other types and sizes of actuator devices having various temperature coefficients are contemplated as exhibiting the same two general principles. Thus, FIG. 6 should not be limited to a specific actuator device, but rather to serve as an example that illustrates how changes in temperature and/or ambient temperature of the actuator device can affect an operational mechanical resonant frequency of the actuator device over time.

Referring more specifically to FIG. 6, three different plots taken at three different times of actuator device 102 driven by a resonant driving system 530 are illustrated. Temp 1 illustrates that the minimum current drawn on startup of the actuator device 102 is about 19 milliamps at a driving frequency $f_{Ro}$, which is about 170.7 Kilohertz. Temp 2 illustrates that the minimum current drawn after warming up the actuator device 102 is about 19 milliamps at a driving frequency $f_{R2}$, which is about 170.4 kilohertz. Temp 3 illustrates that the minimum current drawn at steady state of the actuator device 102 is about 19 milliamps at a driving frequency $f_{R3}$, which is about 170.0 kilohertz. Thus, over time as the actuator device 102 heats up, the operational mechanical resonant frequency of the actuator device 102 decreases and the current drawn increases unless the driving frequency is tracking the mechanical resonant frequency.

To maximize efficiency and to increase performance of the actuator device 102 driven by the resonant driving system 530, the controller 540 monitors the current drawn and compares the current drawn over time with average usages of previously drawn current. Based on the comparison of current usages, the controller 540 can estimate the operational mechanical frequency of the actuator device 102. Depending on whether the operational mechanical resonant frequency is less than, greater than, or about the same as the nominal or previously determined operational mechanical resonant frequency, the controller 540 adjusts and/or steps the driving frequency of the two low-voltage driving signals $544a_2$ and $544b_2$, although the controller 140 can modify other aspects of the same or different signals. For the exemplary actuator device 102 operating at 3.4 volts for which the data of FIG. 6 is provided, the adjustment range of the resonant driving system 530 is between about 166 kilohertz and about 176 kilohertz, although other ranges can be used. In general, for any given actuator system, the adjustment range of the resonant driving system will be within ±3 percent of the operational mechanical resonant frequency of the actuator device 102, although other percentages can be used.

The controller 540 monitors the current usage of the actuator device 102 and the resonant driving system 530 and adjusts and/or steps the driving frequency to be closer to the frequency that results in minimum current and/or voltage usage. Such adjustments to the driving frequency result in near maximum performance and maximum efficiency of the actuator device 102. Put another way, when using a resonant driving system 530, efficiency of the actuator device 102 is maximized and performance is increased when the actuator device 102 is driven with driving signals 544a-544b at a driving frequency as close as possible to the operational mechanical resonant frequency of the actuator device 102.

The controller 540 includes a master clock with a maximum clock frequency. The master clock is the same as, or similar to, the master clock discussed above in relation to FIG. 2. As discussed above in relation to the direct driving system 230 in FIG. 2, the master clock frequency ranges from at least about nine megahertz to at least about forty megahertz. Other clock frequencies are contemplated such as a clock frequency of at least about 20 megahertz.

The proximity of the driving frequency of the driving signals 544a-544b to the operational mechanical resonant frequency of the actuator device 102 depends on the available master clock frequency, which in turn limits an available frequency resolution step size as described above. According to some embodiments, the controller 540 includes a master clock that feeds a direct digital synthesis (DDS) chip. The DDS chip can modulate between adjacent frequencies to provide a greater frequency resolution. For example, a controller 540 implementing the DDS chip can adjust the driving frequency in incremental steps of at least about fifty hertz, although the controller 540 and the DDS chip can have other frequency resolutions such as, for example about three hundred hertz. As the step size of the frequency resolution of the controller 540 gets larger, for example, three hundred hertz is a larger step that fifty hertz, the controller 540 can adjust the driving frequency faster to match and/or come close to the operational mechanical resonant frequency. It is further contemplated that a DDS chip can function in a similar manner with a direct driving system 230 as shown in FIG. 2 and described previously herein.

Figure 7A:
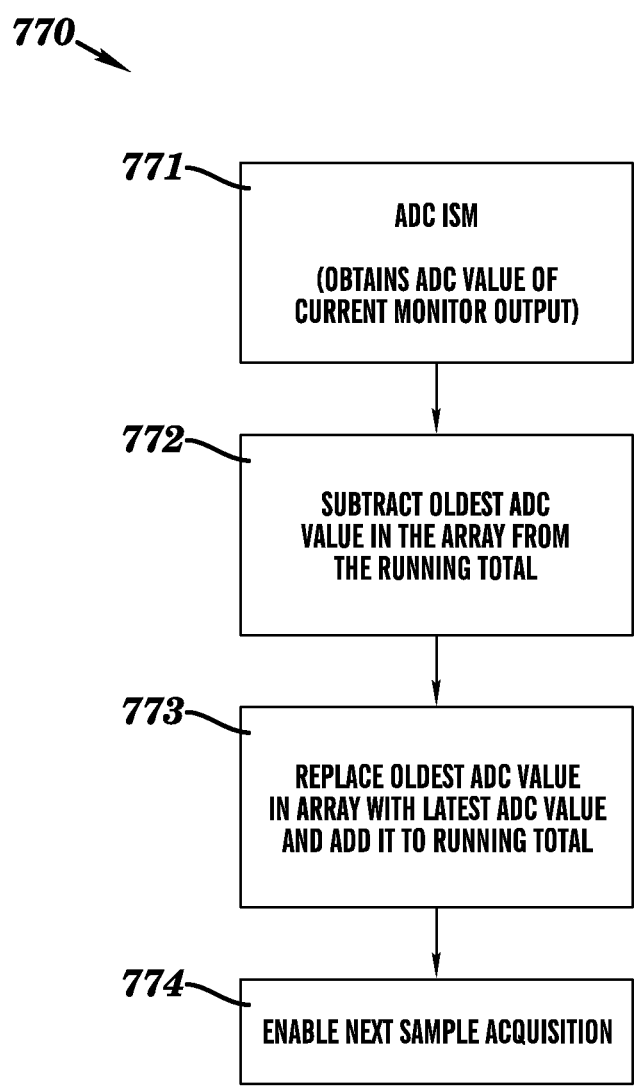
FIG. 7A is a flow chart of an analog-to-digital converter interrupt service method according to some embodiments of the present invention.

Referring to FIGS. 7A-7D, four flow diagrams are shown that illustrate the operation of software and/or firmware in or on the actuator controller 550 and/or the driver assembly 560. According to some embodiments FIGS. 7A-7D are similar to FIGS. 4A-4D described above. FIG. 7A illustrates an ADC interrupt service method (ISM) 770 according to some embodiments. As discussed above in relation to FIG. 5, the current sensor 557 monitors current usage of the driver board 560. The voltage across the current sensor 557 is proportional to the current drawn across the resistor R. In step 771, the ADC 541 periodically receives an analog voltage generated by the current sensor 557 and converts that analog voltage into a digital voltage value, also known as an ADC digital voltage value. Once a new digital voltage value is obtained, then in step 772 the oldest stored digital voltage value is subtracted from a running total by the controller 540 and is stored in random access memory in the actuator controller 550. Next, in step 773 the oldest subtracted digital voltage value is then replaced with the new received digital voltage value and added into the running total by the controller 540. The ADC ISM 770 then awaits its next sample acquisition in step 774, which depends on a predetermined acquisition time increment.

Figure 7B:
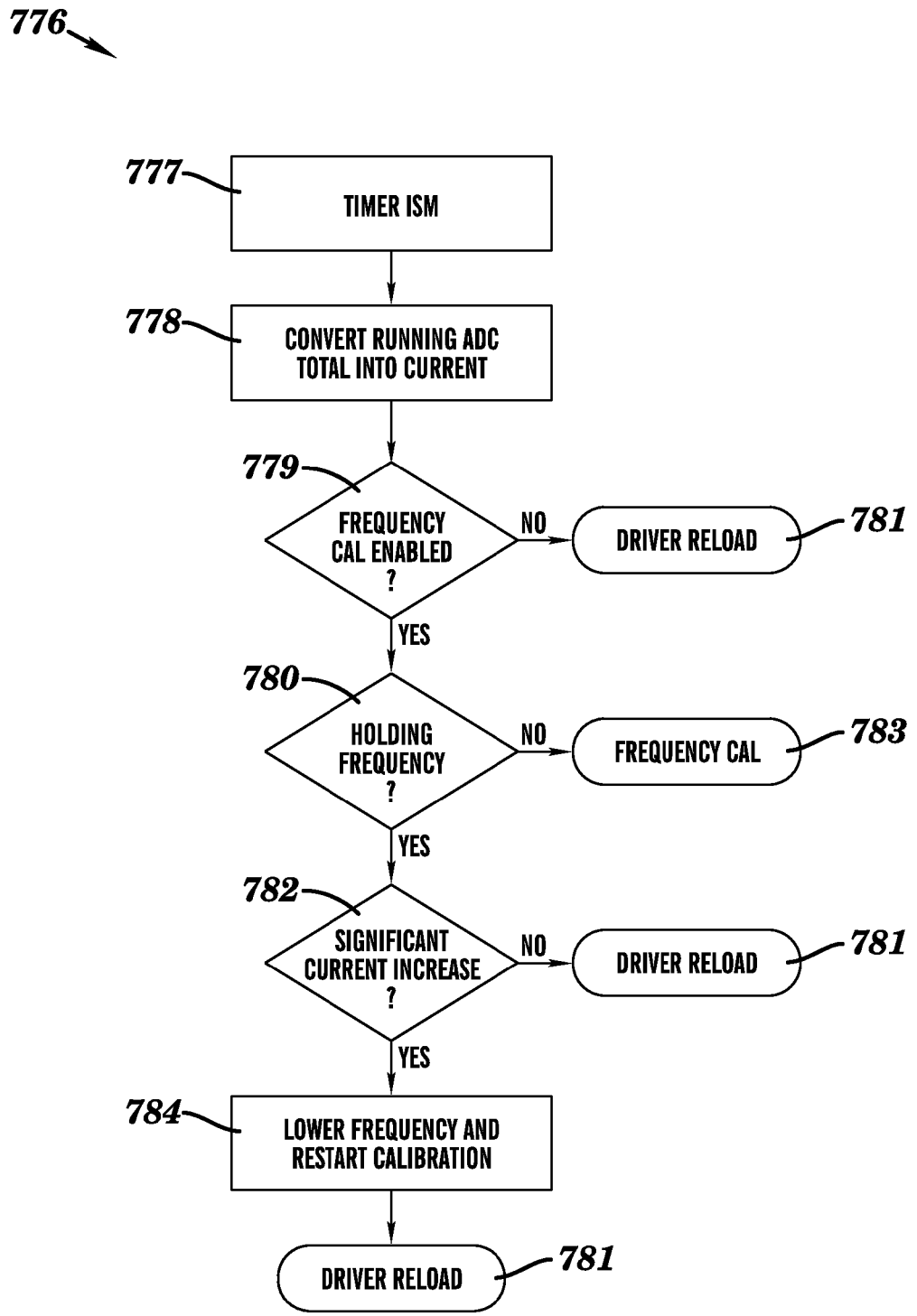
FIG. 7B is a flow chart of a timer interrupt service method according to some embodiments of the present invention.

Referring to FIG. 7B, a timer interrupt service method (ISM) 776 is shown according to some embodiments. In step 777, the timer ISM 770 executes to reload the actuator driver. In step 778, the controller 540 converts the running total of digital voltage values (e.g., thirty digital voltage values) into a running total of digital current values (778). The running total of digital current values can be averaged by dividing by the total number of samples (e.g., thirty samples), although the data can be processed in other manners. This average digital current value is a first current sample that is about equal to the average current drawn by the driver board 560 over a predetermined period of time (e.g., twenty microseconds×thirty samples=600 microseconds).

After the running total of digital voltage values is converted into current values in step 778, then in step 779 the controller 540 determines if frequency calibration is enabled. A user or the controller 540 can turn frequency calibration on or off. If in step 779 the controller 540 determines the frequency calibration is enabled, then the Yes branch is taken to step 780 where the controller 540 determines if the driving frequency is being held. If in step 779 the controller 540 determines the frequency calibration is not enabled, then the No branch is taken to step 781 where the controller 540 reloads a buffer with the previously stored driving frequency.

If in step 780 the controller 540 determines the driving frequency is not being held, then the No branch is taken to step 783 where the driving frequency will be calibrated by the controller 540 as described in greater detail below with reference to FIG. 7C. If in step 780 the controller 540 determines the driving frequency is being held, then the Yes branch is taken to step 782 where the controller 540 determines if there is a significant increase in current usage. A significant increase of current usage can indicate that the actuator device 102 and resonant driving system 530 is not operating at maximum efficiency and increased performance because the operational mechanical resonant frequency of the actuator device 102 has changed.

If in step 782 the controller 540 determines there is a significant increase in current usage, then even though there is a hold on the frequency the Yes branch is taken to step 784 where the controller 540 adjusts the driving frequency and restarts calibration. The default of the controller 540 is to lower the driving frequency because a significant increase in current typically indicates a reduction of the motor system's operational resonant frequency. A significant increase in current can be at least about five milliamps, but the particular value can vary between motor types. If in step 782 the controller 540 determines there is not a significant increase in current usage, then the No branch is taken to step 781 where the controller 540 reloads a buffer with the previously stored driving frequency.

Referring back to FIG. 6, as the actuator device 102 warmed up, the operational mechanical frequency decreased from about 170.8 kilohertz to about 170 kilohertz. A comparison of the Temp 1 plot to the Temp 2 and Temp 3 plots illustrate this point. Initially, the minimum current usage was at $f_{RO}$, which is at about 170.8 kilohertz. Later on in time, the minimum current usage was at $f_{R2}$, which is at about 170.4 kilohertz. The minimum current usage initially was at about 19 milliamps. If the driving frequency is maintained at about 170.8 kilohertz, as the temperature of the actuator device 102 increases, the operational resonant frequency of the actuator device 102 decreases. If the operational resonant frequency drops to, for example, 170 kilohertz, FIG. 6 indicates that the current usage will jump to about 20.5 milliamps. Thus, the default of the timer ISM 776 is to lower the driving frequency in step 784 after detecting a significant increase of current in step 782. After lowering the driving frequency and restarting calibration in step 784, the controller 540 loads the buffer with the new driving frequency in step 781.

Figure 7C:
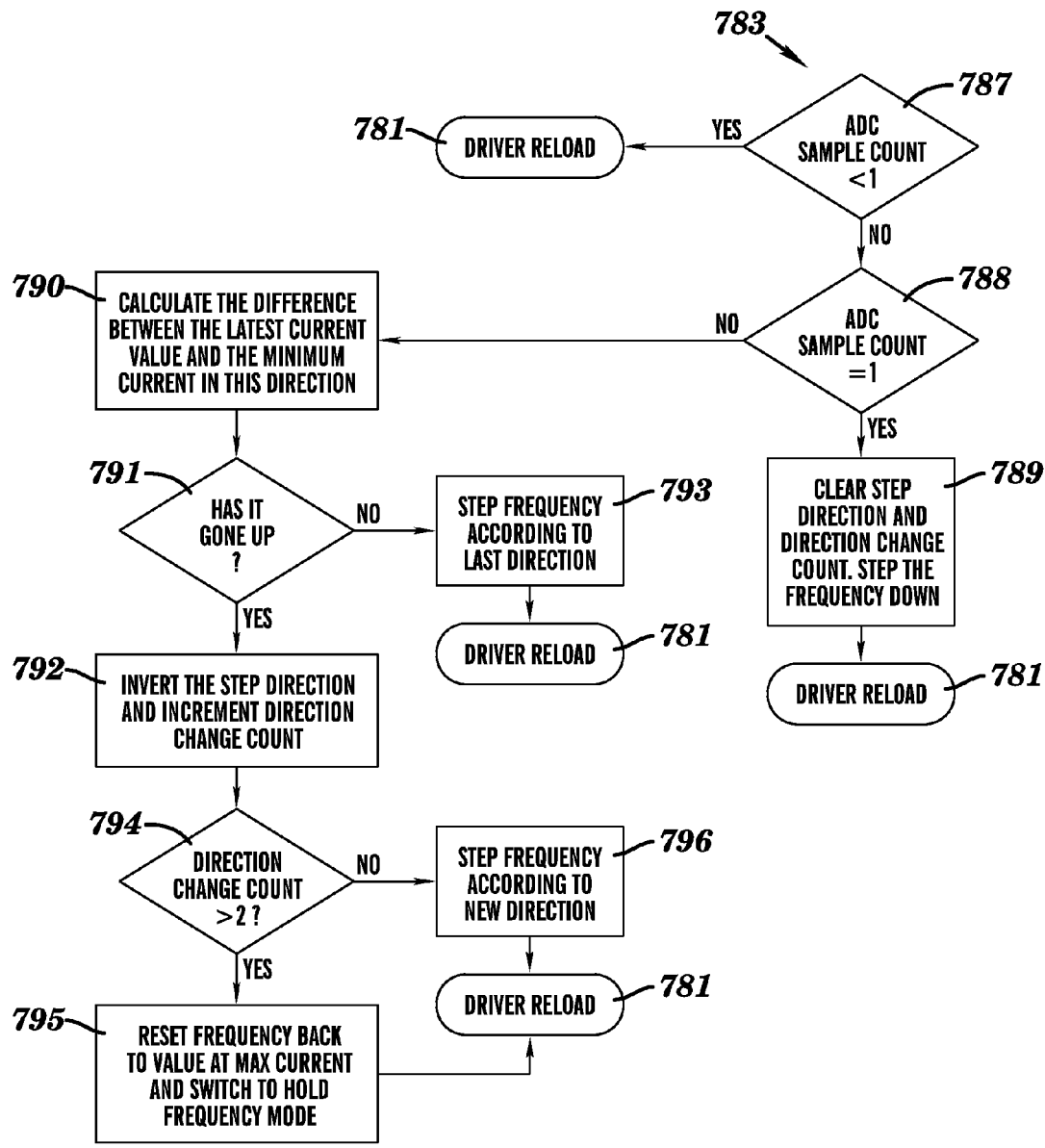
FIG. 7C is a flow chart of a frequency calibration method according to some embodiments of the present invention.

Referring to FIG. 7C, a flow chart is shown that illustrates the driving frequency calibration method of step 783. Referring also to FIG. 7B, if frequency calibration is enabled in step 779 and the driving frequency is not held in step 780, then the controller 540 will calibrate the driving frequency in step 783. Initially, in step 787 the controller 540 determines if an ADC current sample count is less than one. If the controller 540 determines the ADC current sample count is less than one, then the Yes Branch is taken to step 781 where the controller 540 reloads the buffer with the previously stored driving frequency and pulse count because the controller 540 needs at least two current samples for comparison. It is contemplated that instead of analyzing and/or comparing electrical current values to determine change in the operational mechanical resonant frequency, the controller 540 can analyze and/or compare other types of values, such as peak-to-peak voltage values, power values, impedance values, or any combination thereof.

If the controller 540 determines the ADC current sample count is not less than one, then the No Branch is taken to step 788 where the controller determines if the ADC current sample count is equal to one. If in step 788 the controller 540 determines the ADC current sample count is equal to one, then the Yes branch is taken to step 789 where a step direction and a direction change count are cleared and the driving frequency is stepped down by the controller 540. The change direction count tracks the number of times the controller 540 changes the step direction. The step direction determines whether the driving frequency will be increased or decreased. Clearing the step direction initially sets the step direction downward in step 789, which incrementally decreases the driving frequency by the frequency resolution of the controller 540, although in other embodiments the step direction can be initially set to upward. Once the driving frequency is lowered in step 789, the controller 540 reloads the buffer with the new driving frequency in step 781.

If in step 788 the controller 540 determines the ADC current sample count is not equal to one that indicates there are at least two ADC samples available for comparison and the No branch is taken to step 790. One of the at least two current samples is a minimum recorded current sample. In step 790, the controller 540 calculates the difference between the latest current sample with the minimum recorded current sample to determine if the step direction should change or remain constant.

In step 791, the controller 540 determines if the latest current sample has increased. If in step 791 the controller 540 determines the latest current sample has remained constant or decreased, then the No branch is taken to step 793 where the driving frequency is stepped by the frequency resolution of the controller 540 according to the previously stored step direction (e.g., downward). After the driving frequency is stepped according to the last direction in step 793, then the controller 540 reloads the buffer with the new driving frequency in step 781. If in step 791 the controller 540 determines the latest current sample has increased, then the Yes branch is taken to step 792 where the step direction is changed and the direction change counter is incremented by the controller 540. For example, if the initial step direction is downward, then the direction will be changed to upward.

In step 794 the controller 540 determines if the direction change count is greater than two. If in step 794 the controller 540 determines the direction change count is greater than two, then the Yes branch is taken to step 795 where the controller 540 resets the driving frequency to the driving frequency that produced the latest stored minimum current sample and the resonant driving system 530 is switched to the hold driving frequency mode. After the driving frequency is reset in step 795, then the controller 540 reloads the buffer with the new driving frequency in step 781.

If in step 794 the controller 540 determines the direction change count is less than or equal to two, then the No branch is taken to step 796 where the driving frequency is stepped by the frequency resolution of the controller 540 according to the new step direction (e.g., upward). After the driving frequency is stepped according to the new step direction in step 796, then the controller 540 reloads the buffer with the new driving frequency in step 781.

Figure 7D:
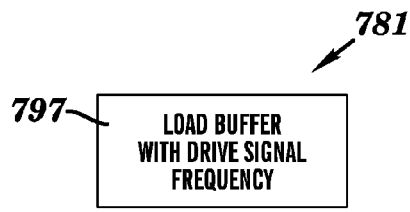
FIG. 7D is a flow chart of a driver reload method according to some embodiments of the present invention.

Referring to FIG. 7D, a flow diagram of the driver reload method of step 781 is shown according to some embodiments. Several scenarios in the timer ISM 776 and the frequency calibration method of step 783 end with the driver reload method of step 781. In the driver reload method of step 781, the buffer is loaded with the frequency of the driving signal and/or period if the frequency changed in step 797. After the buffer is reloaded, the ADC ISM 770 and the timer ISM 776 continue to monitor the current to determine whether to further adjust the driving frequency of the driving signals (e.g., driving signals 544a-544b). The controller 540 runs the frequency calibration method of 783 about every eight hundred microseconds, although the frequency calibration method of step 783 can be run more or less frequently, for example, every four hundred microseconds or every sixteen hundred microseconds.

Figure 8A:
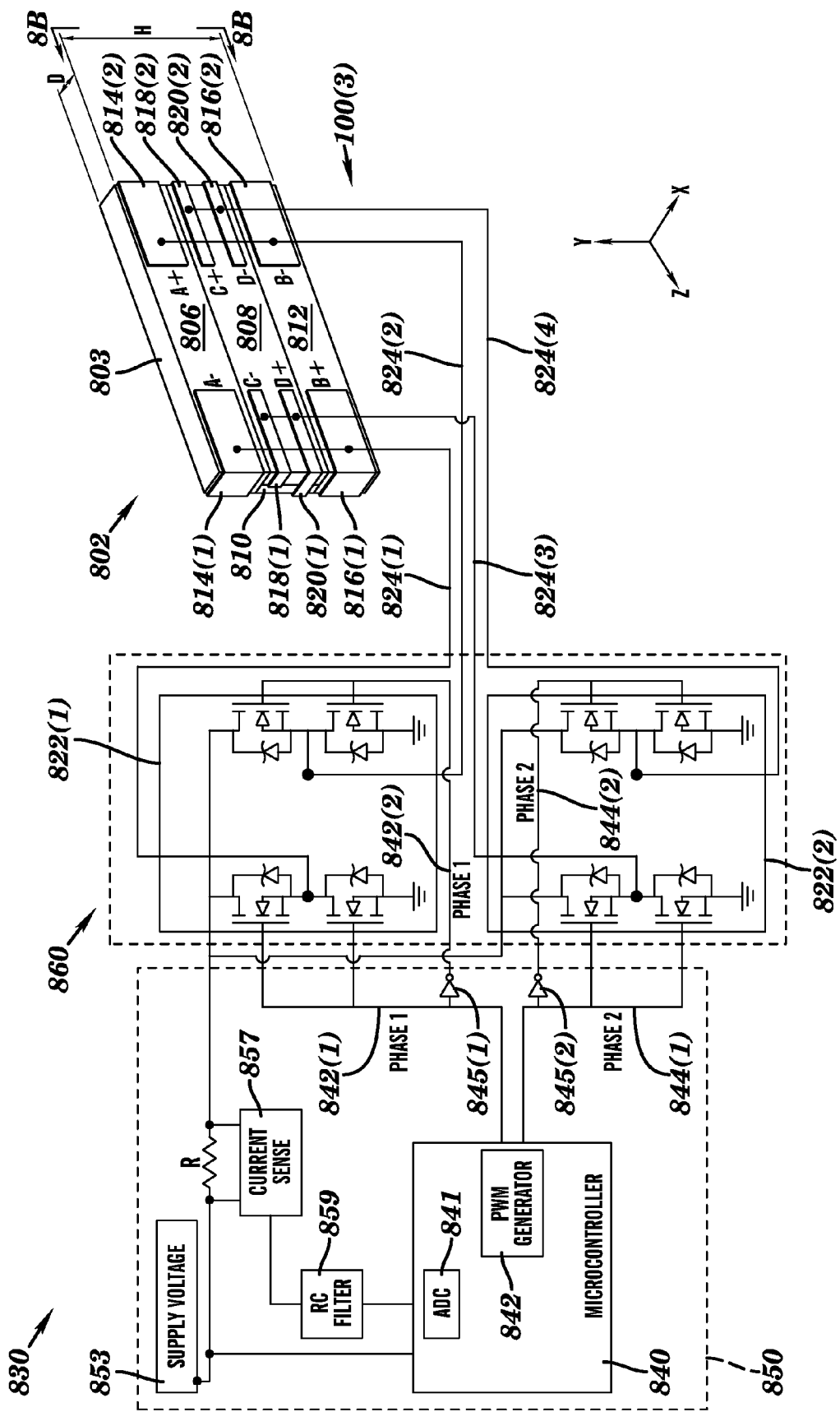
FIG. 8A is partial perspective and partial circuit and block diagram of a semi-resonant drive actuator system in accordance with embodiments of the present invention.

Now referring to FIG. 8A, a semi-resonant drive actuator system 100(3) in accordance with other embodiments of the present invention is shown. The semi-resonant drive actuator system 100(3) with an actuator device 802 which is driven by a driving system 830. As before, the driving system 830 in this example includes an actuator controller and a driving system 830. In this example, the actuator controller in driving system 830 is the same in structure and operation as either actuator controller system 250 or 550 except as described herein, although other types of actuator controller systems can be used. By way of example only, a driving system and method for generating these driving signals for a full bridge circuit in a driver assembly 260 is described in U.S. patent application Ser. No. 12/228,943, entitled, "Semi-Resonant Driving Systems And Methods Thereof", which is herein incorporated by reference in its entirety.

Figure 8B:
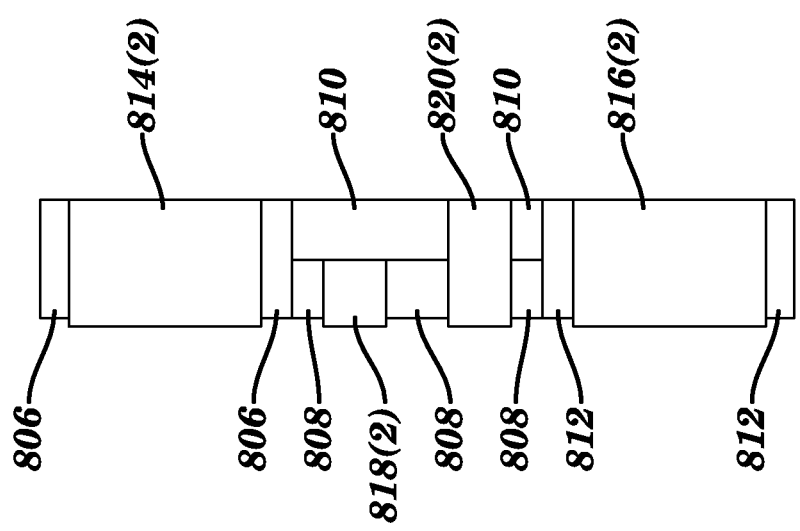
FIG. 8B is an end view of the actuator device illustrated in FIG. 8A taken along line 8B-8B of FIG. 8A.

Referring more specifically to FIGS. 8A and 8B, the actuator device 802 generates a two-dimensional trajectory to frictionally couple to and drive a moveable load such as an optical lens by way of example only, in either of at least two opposing directions, although the actuator device 802 can generate other types of trajectories, be coupled in other manners and at other locations, and move other types of loads in other directions. The actuator device 802 includes an asymmetrical, elongated structure 803, although the actuator device 802 can comprise other types of structures with other shapes and symmetries. The elongated structure 803 has a depth D with a bending mode having a first nominal mechanical resonant frequency "fres1" and a height H with a bending mode having a second nominal mechanical resonant frequency "fres2." The height H is generally greater than the depth D so the second nominal mechanical resonant frequency "fres2" is higher than first nominal mechanical resonant frequency "fres1", although the structure can have other dimensions. By way of example only, other factors that affect nominal mechanical resonance frequency include manufacturing tolerances, material stiffness, mass, and location and orientation of internal electrodes. As described above, factors that affect an operational mechanical frequency of the structure 803 include, by way of example only, actuator temperature and ambient temperature.

The elongated structure 803 includes four piezoelectric regions 806, 808, 810, and 812, and electrodes 814(1) and 814(2), electrodes 816(1) and 816(2), electrodes 818(1) and 818(2), and electrodes 820(1) and 820(2), although the structure 803 can comprise other numbers, types and shapes of structures with other numbers and types of regions and connectors. By way of example only, in alternative embodiments one of the two piezoelectric regions 806 and 812 and one of the piezoelectric regions 808 and 810, could be inactive which would reduce the drive amplitude, but otherwise would not alter the operation of the actuator system, although other combinations of active and inactive regions could be used.

Each piezoelectric region 806, 808, 810, and 812 has a polarity that is established by poling during manufacturing, creating a positive electrode and a negative electrode. The piezoelectric regions 806, 808, 810, and 812 are poled during manufacturing so that "L" shaped electrode 814(1) is negative (A−) and "L" shaped electrode 814(2) is positive (A+) for region 806, "L" shaped electrode 816(2) is negative (B−) and "L" shaped electrode 816(1) is positive (B+) for region 812, "L" shaped electrode 818(1) is negative (C−) and "L" shaped electrode 818(2) is positive (C+) for region 808, "L" shaped electrode 820(2) is negative (D−) and "L" shaped electrode 820(1) is positive (D+) for region 810, although the piezoelectric regions can be formed in other manners. In the elongated structure 803, the piezoelectric regions 808 and 810 are located adjacent each other and between outer piezoelectric regions 806 and 812 as illustrated, although the structure could have other numbers of piezoelectric regions in other configurations.

The direct driving system 830 is shown operatively coupled to the actuator device 802. As discussed above, the direct driving system 830 can also be used to drive a variety of different actuator devices including, but not limited to actuator device 102 and also other linear motor systems employing multi-layer piezoelectric plates as described in the aforementioned copending and commonly owned U.S. patent application Publication Ser. No. 12/228,923; rotary motor systems, semi-resonant actuator systems as described in the aforementioned copending and commonly owned U.S. patent Application Publication Ser. No. 12/228,943; linear tube motor systems, rotary tube motor systems, and ultrasonic motor systems. The direct driving system 830 can reside on a motherboard or computer chip. The direct driving system 830 comprises a controller board or actuator controller system 850 and a driver assembly 860, although other numbers and types of boards or chips can be used. The driver assembly 860 can also be referred to as an actuator driver or a motor driver.

The actuator controller system 850 includes a processing system or controller 840, a supply voltage or voltage source 853, a current sensor 857, and a filter 859, although the actuator controller system 850 can include other types and numbers of systems, devices, and components which are connected in other manners. The controller 840 can be a processor, a microprocessor, a microcontroller, a digital signal processor or other controller motherboard, although other numbers and types of controllers can be used. The voltage source 853 is a battery that supplies power to run, for example, the actuator device 802 and the various onboard electronics (e.g., controller 840), although other types and numbers of power supplies can be used. In this example, the voltage source 853 can supply a voltage of approximately 1.5 volts to approximately 3.3 volts, although other ranges of voltages could be supplied and used. The voltage source 853 is coupled to the driver assembly 860.

The current sensor 857 is coupled between the voltage source 853 and the driver assembly 860 and monitors current usage of the driver assembly 860. The current sensor 857 detects an analog voltage drop across resistor R which is proportional to the current drawn across the resistor R by the driver assembly 860 for a fixed operating speed of the actuator device 802 and the direct driving system 830. Thus, the voltage drop can be used to calculate the current drawn by the actuator device 802 and the direct driving system 830 using a multiplier.

The resistor R can have a resistance from about 0.025 ohms to about 1 ohms, although other ranges for the resistance and other types and numbers of resistors in other combinations can be used, depending upon the expected current usage. As the resistance of resistor R increases, the voltage drop across the resistor R increases, which increases the sensitivity of the current sensor 857. However, a larger voltage drop may require a more powerful voltage source to maintain a sufficient power supply to run the direct drive actuator system 100(3) and the onboard electronics. The current sensor 857 also is coupled to the filter 889, which removes the AC drive frequency component, although other configurations can be used, such as having the current sensor 857 directly coupled to the controller 840 without a filter.

The controller 840 is directly coupled to the voltage source 853 and to the filter 859, although the controller 840 could have other types and numbers of connections. The controller 840 includes an analog-to-digital converter 841 ("ADC") and a pulse width modulated ("PWM") signal generator 842, although the controller 840 can include other types and numbers of systems, devices, assemblies, and components in other configurations, such as a master clock described later herein. The analog-to-digital converter 841 receives the analog voltage signal as an input from the filter 859 and converts that analog voltage signal into a digital voltage value. The pulse width modulated signal generator 842 is coupled to the driver assembly 860. The pulse width modulated signal generator 842 generates low-voltage driving signals 842(1) and 844(1), although the pulse width modulated signal generator 842 could generate other numbers and types of signals. Inverters 845(1) and 845(2) are coupled to the pulse width modulated signal generator 842 and receive the low-voltage driving signals 842(1) and 844(1) which are inverted to generate additional low-voltage driving signals 842(2) and 844(2), respectively. The low voltage and inverted driving signals 842(1), 842(2), 844(1), and 844(2) are coupled through the driver assembly 860 on to outputs 824(1)-824(4) to drive the four piezoelectric regions 806, 808, 810, and 812, although other numbers and types of signals could be generated and used.

In this example, the controller 840 uses a multiplier, the value of which is based on sensor resistor R and type of current sensor electronics 857, to convert the digital voltage value into a digital current value, which is used to determine a driving frequency of the low-voltage driving signals 842(1), 842(2), 844(1), and 844(2). The controller 840 can use the digital current value, a plurality of digital current values, or an average digital current value to determine if an adjustment to the drive frequency is getting closer or farther from the operational mechanical resonant frequency of the actuator device 802. Put another way, the controller 840 can cause the PWM signal generator 842 to adjust a driving frequency of a generated signal (e.g., low-voltage driving signals 842(1), 842(2), 844(1), and 844(2) up or down based at least in part on digital current values.

The driver assembly 860 includes a pair of full bridge drive circuits 822(1) and 822(2) each of which are coupled to the voltage source 853 and have four outputs 824(1)-824(4) which provide ultrasonic, square wave driving signals 842(1), 842(2), 844(1), and 844(2), although other types and numbers of driving circuits and systems, such as a half bridge circuit system by way of example only, with other number of outputs which provide other types of signals, such as sinusoidal shaped-signals by way of example only, can be used. The output 824(1) from full bridge drive circuit 822(1) is coupled to electrodes 814(1) and 816(1), the output 824(2) from full bridge drive circuit 822(1) is coupled to electrodes 814(2) and 816(2), the output 824(3) from full bridge drive circuit 822(2) is coupled to electrodes 818(1) and 820(1), and the output 824(4) from full bridge drive circuit 822(2) is coupled to electrodes 818(2) and 820(2), although other types and numbers of connections could be used Although a full bridge drive circuit has been described, other types of driving systems can be used. One of the advantages of using a full bridge drive circuit is that the effective voltage differential across the positive electrode and negative electrode of each of the piezoelectric members (e.g., piezoelectric members 132a-132d) is twice the supply voltage, which effectively doubles the mechanical output as compared with a half bridge circuit with the same supply voltage, which saves space. U.S. patent application Ser. No. 12/228,923, entitled, "Reduced-Voltage, Linear Motor Systems and Methods Thereof" provides additional description of the full bridge drive circuit along with the driving signals which are generated which is herein incorporated by reference in its entirety. Since the components and operation of half bridge drive circuits and full bridge drive circuits are well known to those of ordinary skill in the art, they will not be described in greater detail herein.

The operation of the semi-resonant actuator system 800 will now be described with reference to FIGS. 8A and 8B. As described above, the elongated structure 803 has two bending modes, mode1 and mode2, which each having different nominal and operational mechanical resonant frequencies. The vibration amplitude in either of these bending modes is dependent on the driving frequency of the applied driving signals. When the driving system 830 applies driving signals at the nominal and/or operational mechanical resonant frequency for one of the bending modes, such as the frequency "fres1" of mode1 to both bending modes of the structure 803, the vibration amplitude is fully amplified for the bending mode operating at its operational mechanical resonant frequency and is only partially amplified for the other bending mode which is operating at partial resonance. When the driving system 830 applies driving signals at the operational mechanical resonant frequency "fres2" for the other one of the bending modes, such as the frequency of mode2, to both bending modes of the structure 803, the vibration amplitude is fully amplified for the bending mode operating at its operational mechanical resonant frequency and is only partially amplified for the other bending mode which is operating at partial resonance.

Partial resonance can also be referred to as semi-resonance, which is now described in greater detail. In a typical mechanical system under forced excitation at frequency f, the normalized amplitude A is:

$$A = \frac{Q_M}{\sqrt{z^2 + (z^2 - 1)^2 Q_M^2}}$$

where A is the amplitude (relative to DC level $A_o$).

$$z = \frac{f}{f_o}$$

where $f_o$ is the nominal mechanical resonant frequency of this system and f is the driving frequency. $Q_M$ is the mechanical quality factor, ($Q_M$ can be as high as 100 or more). For a typical amplitude resonance curve for frequency from 0 (DC) to well past nominal mechanical resonant frequency ($f_o$), amplitude A at DC is normalized to 1; amplitude A at resonance ($f=f_o$) is amplified by $Q_M$; amplitude at $f \gg f_o$ drops to close to 0. Amplitude A can range from 1 (at DC) to $Q_M$ at resonant frequency. In these embodiments, partial resonance or semi-resonance occurs when A ranges between about 2 to $$\frac{Q_M}{2},$$

although other ranges outside of this range could be used, such as when A is between 1 and $Q_M$ could be used.

Four driving signals 842(1), 842(2), 844(1), and 844(2) are transmitted from the outputs 824(1)-824(4) of the full bridge drive circuits 822(1) and 822(2) to respective electrodes on the structure 803. The driving signals from outputs 824(1)-824(2) are phase shifted by the driving system 830 with respect to the driving signals from outputs 824(3)-824(4) between about zero degrees to about ninety degrees for moving the movable member in one of the two directions, although other ranges for the phase shift can be used. Additionally, the driving system 830 adjusts the phase shift to between about negative one hundred eighty degrees to about negative ninety degrees for moving the movable member in the opposite direction between outputs 824(1)-824(2) and outputs 824(3)-824(4), although other ranges for the phase shift can be used.

The driving system 830 includes a controller 840 that monitors and/or analyzes at least one of current values, voltage values, power values, impedance values, or any combination. The controller 840 in driving system 830 monitors current usage of the semi-resonant actuator system 100(3) and compares a first current value with a second current value to determine changes in the operational mechanical resonant frequency of one of the two bending modes of the actuator device 802. In these embodiments, the controller 840 in the driving system 830 monitors and adjusts and/or steps the driving frequency of the driving signals to keep the driving frequency close to or at a fixed offset from the operational mechanical resonant frequency of the bending mode operating at full resonance. The controller 840 in the driving system 830 does not adjust the driving frequency based on the operational mechanical resonant frequency of the bending mode operating at partial resonance.

In embodiments of the present invention, it is contemplated that in the operation of an actuator device 102 and 802, only one of the two bending modes is controlled by the direct driving system 230, discussed above and shown in FIG. 2, or by the resonant driving system 530, discussed above and shown in FIG. 5, or by the driving system 830. In one embodiment, the driving signals from outputs 824(3)-824(4) are provided to resonant piezoelectric regions 808 and 810 at a frequency close to or at a fixed offset from the operational mechanical resonant frequency of the bending mode of the actuator device 802 in the X-Z plane, with the driving signals from outputs 824(1)-824(2) provided to the piezoelectric regions 806 and 812 at the same frequency. Further details on the structure and operation of the actuator device 802 along with the driving system 830 may be found in the aforementioned copending and commonly owned U.S. patent application Publication Ser. No. 12/228,943, with reference in particular to FIGS. 1-11B, and the written description thereof which again is incorporated by reference in its entirety herein.

Although embodiments of examples of the driving systems 230, 530, and 830 including processing systems or controllers 240, 540, and 840, respectively, are described and illustrated herein, the driving systems 230, 530, and 830 including processing systems or controllers 240, 540, and 840, respectively, each can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

A variety of applications exist for the exemplary actuator systems, such as the direct drive actuator system 100(1), the resonant drive actuator system 100(2), and the semi-resonant drive actuator system 100(3), described and illustrated herein. For example, several alternative applications for such actuator systems can be found in U.S. Pat. No. 6,940,209, titled, "Ultrasonic Lead Screw Motor"; U.S. Pat. No. 7,339,306, titled, "Mechanism Comprised of Ultrasonic Lead Screw Motor"; U.S. Pat. No. 7,170,214, titled, "Mechanism Comprised of Ultrasonic Lead Screw Motor"; and U.S. Pat. No. 7,309,943, titled, "Mechanism Comprised of Ultrasonic Lead Screw Motor," all of which are commonly assigned to New Scale Technologies, Inc.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. An actuator system comprising:
   a first actuator device comprising at least one piezoelectric member;
   a second actuator device comprising at least one piezoelectric member;
   a driving system that drives each of the at least one piezoelectric members at a driving frequency; and
   an actuator controller that monitors currents of the first and second actuator devices and the driving system, wherein the driving system is configured to determine a single operational mechanical resonant frequency of the first and second actuator devices based on the monitored currents, the actuator controller adjusts the driving frequency based at least in part on the determined single operational mechanical resonant frequency of the first and second actuator devices.

2. The system as set forth in claim 1, wherein the actuator device further comprises:
   an element with a threaded passage; and
   a threaded shaft with an axis of rotation which extends through the threaded passage, the threaded shaft at least partially engaged with at least a portion of the threaded passage, the at least one piezoelectric member further comprises at least two of the piezoelectric members operatively connected to the element.

3. The system as set forth in claim 2, wherein the driving system is configured to provide the driving frequency which subjects the element to vibrations causing the threaded shaft to simultaneously rotate and translate in the direction along the axis of rotation through the element and apply an axial force in the direction along the axis of rotation.

4. The system as set forth in claim 2, wherein the threaded shaft is operatively connected to a load which is moveable in the direction along the axis of rotation.

5. The system as set forth in claim 1, wherein the driving system is a direct driving system which provides a voltage boost for boosting an input voltage.

6. The system as set forth in claim 1, wherein the driving system is a resonant driving system comprising at least one tank circuit which provides a voltage boost for boosting an input voltage.

7. The system as set forth in claim 6, wherein the at least one tank circuit has an electrical resonant frequency which is substantially the same as a nominal mechanical resonant frequency of the first and second actuator devices.

8. The system as set forth in claim 1, wherein the actuator controller adjusts the driving frequency when the difference between the driving frequency and the single operational mechanical resonant frequency is at least greater than an available frequency resolution step size.

9. The system as set forth in claim 8, wherein the available frequency resolution step size is less than one percent of the single operational mechanical resonant frequency.

10. The system as set forth in claim 1 wherein the actuator controller adjusts the driving frequency one or more times to identify at least one of the single operational mechanical resonant frequency and a set offset from the single operational mechanical resonant frequency.

11. The system as set forth in claim 10 wherein the driving system adjusts the driving frequency within a set window about the single operational mechanical resonant frequency.

12. The system as set forth in claim 1, wherein the actuator controller continuously monitors the current through at least one cycle of the first and second actuator devices.

13. The system as set forth in claim 1, wherein the driving system further comprises at least one full bridge drive system.

14. The system as set forth in claim 1, wherein the driving system further comprises at least one half bridge drive system.

15. The system as set forth in claim 1, wherein each of the first and second actuator devices further comprises a first pair of opposing piezoelectric members including a first piezoelectric member and a second piezoelectric member and a second pair of opposing piezoelectric members including a third piezoelectric member and a fourth piezoelectric member.

16. The system as set forth in claim 1, wherein the actuator controller further comprises:
   a monitoring system in an actuator controller computing system that monitors the currents of the actuator devices and the driving system coupled to drive the actuator device at the driving frequency;
   a controller management system in the actuator controller computing system that determines the single operational mechanical resonant frequency of the actuator devices based on the monitored currents; and
   an adjustment system in the actuator controller computing system that adjusts the driving frequency provided by the driving system based at least in part on the determined single operational mechanical resonant frequency of the actuator devices.

17. The system as set forth in claim 16 wherein the monitoring system in the actuator controller computing system further monitors the currents through at least one cycle of the actuator devices.

18. The system as set forth in claim 16 wherein the currents of the driving frequency provided to the actuator devices that vibrates substantially at resonance.

19. The system as set forth in claim 16 wherein the adjustment system in the actuator controller computing system adjusts the driving frequency so one bending mode of the actuator devices is vibrating substantially at resonance and another bending mode of the actuator devices is vibrating at partial resonance.

20. The system as set forth in claim 16 wherein the adjustment system in the actuator controller computing system adjusts the driving frequency to a fixed offset from the resonant frequency of a bending mode of the actuator devices.

21. The system as set forth in claim 16 wherein the adjustment system in the actuator controller computing system adjusts the driving frequency when the difference between the driving frequency and the single operational mechanical resonant frequency is at least greater than an available frequency resolution step size.

22. The system as set forth in claim 21 wherein the available frequency resolution step size is less than one percent of the single operational mechanical resonant frequency.

23. The system as set forth in claim 16 wherein the adjustment system in the actuator controller computing system adjusts the driving frequency one or more times to identify at least one of the single operational mechanical resonant frequency and a set offset from the single operational mechanical resonant frequency.

24. The system as set forth in claim 23 wherein the adjustment system in the actuator controller computing system adjusts the driving frequency within a set window about the single operational mechanical resonant frequency.

25. The system as set forth in claim 1 wherein the actuator controller compares the steady state operating current with an average current of the actuating devices and adjusts the driving frequency based at least in part on the comparison between the steady state operating current with the average current of the actuator devices.

26. An actuator system comprising:
an actuator device comprising at least one piezoelectric member, wherein the actuator device comprises a structure with the at least one piezoelectric member and having at least one point to frictionally couple to and drive a movable element in at least one direction, the structure having at least two bending modes, each of the bending modes having a different resonant frequency;
a driving system that drives the at least one piezoelectric member at a driving frequency; and
an actuator controller that monitors a current of the actuator device and the driving system to determine an operational mechanical resonant frequency of the actuator device based on the current, the actuator controller adjusts the driving frequency based at least in part on the determined operational mechanical resonant frequency, wherein the driving system is configured to apply one or more driving frequencies to each of the bending modes of the structure, the driving frequency is substantially the same as one of the resonant frequencies of the bending modes, wherein at the driving frequency, one of the bending modes of the structure is vibrating substantially at resonance and the other of the bending modes of the structure is vibrating at partial resonance.

27. The system as set forth in claim 26, wherein the driving frequency is provided at a fixed offset from the resonant frequency of the bending mode that is vibrating substantially at resonance.

28. The system as set forth in claim 26, wherein the current of the driving frequency supplied to the at least one piezoelectric member of the structure that vibrates substantially at resonance.

29. The system as set forth in claim 26, wherein the driving frequency is provided at a fixed offset from the resonant frequency of the bending mode that is vibrating substantially at resonance.

30. The system as set forth in claim 26, wherein the driving system is a direct driving system which provides a voltage boost for boosting an input voltage.

31. The system as set forth in claim 26, wherein the driving system is a resonant driving system comprising at least one tank circuit which provides a voltage boost for boosting an input voltage.

32. The system as set forth in claim 31, wherein the at least one tank circuit has an electrical resonant frequency which is substantially the same as a nominal mechanical resonant frequency of the actuator device.

33. The system as set forth in claim 26, wherein the actuator controller adjusts the driving frequency when the difference between the driving frequency and the operational mechanical resonant frequency is at least greater than an available frequency resolution step size.

34. The system as set forth in claim 33, wherein the available frequency resolution step size is less than one percent of the operational mechanical resonant frequency.

35. The system as set forth in claim 26 wherein the actuator controller adjusts the driving frequency one or more times to identify at least one of the operational mechanical resonant frequency and a set offset from the operational mechanical resonant frequency.

36. The system as set forth in claim 35 wherein the driving system adjusts the driving frequency within a set window about the operational mechanical resonant frequency.

37. The system as set forth in claim 26, wherein the actuator controller continuously monitors the current through at least one cycle of the actuator device.

38. The system as set forth in claim 26, wherein the driving system further comprises at least one full bridge drive system.

39. The system as set forth in claim 26, wherein the driving system further comprises at least one half bridge drive system.

40. The system as set forth in claim 26, wherein the actuator device further comprises a first pair of opposing piezoelectric members including a first piezoelectric member and a second piezoelectric member and a second pair of opposing piezoelectric members including a third piezoelectric member and a fourth piezoelectric member.

41. The system as set forth in claim 26, wherein the actuator controller further comprises:
a monitoring system in an actuator controller computing system that monitors the current of the actuator device and the driving system coupled to drive the actuator device at the driving frequency;
a controller management system in the actuator controller computing system that determines the operational mechanical resonant frequency of the actuator device based on the current; and
an adjustment system in the actuator controller computing system that adjusts the driving frequency provided by the driving system based at least in part on the determined operational mechanical resonant frequency.

42. The system as set forth in claim 41 wherein the monitoring system in the actuator controller computing system further monitors the current through at least one cycle of the actuator device.

43. The system as set forth in claim 41 wherein the current of the driving frequency provided to the actuator device that vibrates substantially at resonance.

44. The system as set forth in claim 41 wherein the adjustment system in the actuator controller computing system adjusts the driving frequency so one bending mode of the actuator device is vibrating substantially at resonance and another bending mode of the actuator device is vibrating at partial resonance.

45. The system as set forth in claim 41 wherein the adjustment system in the actuator controller computing system adjusts the driving frequency to a fixed offset from the resonant frequency of a bending mode of the actuator device.

46. The system as set forth in claim 41 wherein the adjustment system in the actuator controller computing system adjusts the driving frequency when the difference between the driving frequency and the operational mechanical resonant frequency is at least greater than an available frequency resolution step size.

47. The system as set forth in claim 46 wherein the available frequency resolution step size is less than one percent of the operational mechanical resonant frequency.

48. The system as set forth in claim 41 wherein the adjustment system in the actuator controller computing system adjusts the driving frequency one or more times to identify at least one of the operational mechanical resonant frequency and a set offset from the operational mechanical resonant frequency.

49. The system as set forth in claim 41 wherein the adjustment system in the actuator controller computing system adjusts the driving frequency within a set window about the operational mechanical resonant frequency.

50. The system as set forth in claim 41 wherein the actuator controller compares the steady state operating current with an average current of the actuating device and adjusts the driving frequency based at least in part on the comparison between the steady state operating current with the average current of the actuator device.

\* \* \* \* \*